(12) United States Patent
Teyeb et al.

(10) Patent No.: US 12,184,563 B2
(45) Date of Patent: Dec. 31, 2024

(54) MEASUREMENT GAP CONFIGURATION IN NE-DC AND NR-NR DC

(71) Applicant: TELEFONAKTIEBOLAGET LM ERICSSON (PUBL), Stockholm (SE)

(72) Inventors: Oumer Teyeb, Solna (SE); Stefan Wager, Espoo (FI); Antonio Orsino, Kirkkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 533 days.

(21) Appl. No.: 17/267,903

(22) PCT Filed: Aug. 8, 2019

(86) PCT No.: PCT/IB2019/056742
§ 371 (c)(1),
(2) Date: Feb. 11, 2021

(87) PCT Pub. No.: WO2020/031122
PCT Pub. Date: Feb. 13, 2020

(65) Prior Publication Data
US 2022/0216959 A1 Jul. 7, 2022

Related U.S. Application Data

(60) Provisional application No. 62/716,876, filed on Aug. 9, 2018.

(51) Int. Cl.
*H04L 5/00* (2006.01)
*H04W 36/00* (2009.01)
*H04W 76/25* (2018.01)

(52) U.S. Cl.
CPC ........... *H04L 5/0032* (2013.01); *H04W 76/25* (2018.02); *H04W 36/00698* (2023.05)

(58) Field of Classification Search
CPC .... H04L 5/0032; H04W 76/25; H04W 72/23; H04W 76/20; H04W 76/16; H04W 88/06; H04W 36/0088; H04W 36/0069
See application file for complete search history.

(56) References Cited

U.S. PATENT DOCUMENTS

| 2021/0136616 A1* | 5/2021 | Xie | H04W 24/10 |
| 2021/0144658 A1* | 5/2021 | Han | H04W 56/001 |
| 2021/0378046 A1* | 12/2021 | Shimoda | H04B 7/022 |

FOREIGN PATENT DOCUMENTS

RU        2662448 C1      7/2018

OTHER PUBLICATIONS

R2-1804398, ZTE et al., "Measurement and gap configuration framework in NE-DC", 3GPP TSG-RAN WG2 Meeting #101bis, China, Apr. 2018 (Year: 2018).*

(Continued)

*Primary Examiner* — Benjamin H Elliott, IV
*Assistant Examiner* — Yewon Kim
(74) *Attorney, Agent, or Firm* — Ericsson Inc.

(57) ABSTRACT

A method by a master network node for measurement gap configuration includes establishing a connection with a wireless device operating in dual connectivity with the master network node and a secondary network node. The master network node operates on a New Radio, NR, wireless network and the secondary network node operates on a Long-Term Evolution, LTE, network. The measurement gap configuration is configured on a per frequency basis for at least a first frequency and a second frequency on the NR wireless network. The measurement gap configuration is configured on a per frequency basis for the first frequency on the LTE network. The method further incudes configuring, by the master network node, the wireless device with at least one measurement gap for the second frequency when the (Continued)

master network node configures a measurement that requires the at least one measurement gap.

22 Claims, 18 Drawing Sheets

(56) References Cited

OTHER PUBLICATIONS

R2-1814678, Ericsson, "MR-DC and NR-DC measurement principles", 3GPP TSG-RAN WG2#103bis, Chengdu, China, Oct. 8-12, 2018 (Year: 2018).*
R2-1808686, Nokia et al., "Consideration on Measurement Gap in NE-DC", 3GPP TSG-RAN WG2 Meeting #102, South Korea, May 2018 (Year: 2018).*
R2-1807736, ZTE Corporation, "Measurement and gap configuration framework in NE-DC", 3GPP TSG-RAN WG2 #102, South Korea, May 2018 (Year: 2018).*
Nokia, et al., Consideration on Measurement Gap in NE-DC, R2-1808686, 3GPP TSG-RAN WG2 Meeting #102, Busan, South Korea, May 21-25, 2018.
CMCC, Measurement Gap Configuration for Remaining DC Scenarios, R2-1810634, 3GPP TSG-RAN WG2 NR AH1807 Meeting, Montreal, Canada, Jul. 2-6, 2018.
Ericsson, MR-DC and NR-DC measurement principles, R2-1814678, 3GPP TSG-RAN WG2#103bis, Chengdu, China, Oct. 8-12, 2018.
Ericsson. "NE-DC measurement principles", 3GPP TSG-RAN WG2 #102 Tdoc (R2-1807082), Busan, Republic of Korea, May 10, 2018 (Revision of Tdoc R2-1805451) (revealed Sep. 29, 2021) internet https://www.3gpp.org/DynaReport/TDocExMtg--R2-102--18785.htm.

* cited by examiner

MEASUREMENT GAP CONFIGURATION IN NE-DC AND NR-NR DC

This application is a 371 of International Application No. PCT/IB2019/056742, filed Aug. 8, 2019, which claims the benefit of U.S. Application No. 62/716,876, filed Aug. 9, 2018, the disclosures of which are fully incorporated herein by reference.

BACKGROUND

In multi-carrier or carrier aggregation (CA) operation the user equipment (UE) is able to receive and/or transmit data to more than one serving cell. In other words, a CA-capable UE can be configured to operate with more than one serving cell. The carrier of each serving cell is generally referred to as a component carrier (CC). In simple words, the CC means an individual carrier in a multi-carrier system. CA is also referred to as "multi-carrier system," "multi-cell operation," "multi-carrier operation," "multi-carrier" transmission and/or reception. This means the CA is used for transmission of signaling and data in the uplink (UL) and downlink (DL) directions. One of the CCs is the primary component carrier (PCC) or simply primary carrier or even anchor carrier. The remaining ones are called secondary component carrier (SCC) or simply secondary carriers or even supplementary carriers. The serving cell may be interchangeably referred to as primary cell (PCell) or primary serving cell (PSC). Similarly, the secondary serving cell may be interchangeably referred to as secondary cell (SCell) or secondary serving cell (SSC).

Generally, the primary or anchor CC carries the essential UE-specific signaling. The primary CC (aka PCC or PCell) exists in both UL and DL directions in CA. In case there is a single UL CC, the PCell is obviously on that CC. The network may assign different primary carriers to different UEs operating in the same sector or cell.

In Dual Connectivity (DC) operation, the UE can be served by at least two nodes called master eNB (MeNB) and secondary eNB (SeNB). More generally, in multiple connectivity (aka multi-connectivity) operation the UE can be served by two or more nodes where each node operates or manages one cell group (e.g., MeNB, SeNB1, SeNB2 and so on). More specifically, in multi-connectivity each node serves or manages at least secondary serving cells belonging to its own cell group. Each cell group contains one or more serving cells. The UE is configured with PCC from both MeNB and SeNB. The PCell from MeNB and SeNB are referred to as PCell and PSCell, respectively. The UE is also configured with one or more SCCs from each of MeNB and SeNB. The corresponding secondary serving cells served by MeNB and SeNB are called SCells. The UE in DC typically has separate TX/RX for each of the connections with MeNB and SeNB. This allows the MeNB and SeNB to independently configure the UE with one or more procedures (e.g., radio link monitoring (RLM), discontinuous reception (DRX) cycle, etc.) on their PCell and PSCell, respectively.

In multi-connectivity, all cell groups may contain serving cells of the same Radio Access Technology (RAT) (e.g., Long Term Evolution (LTE)) or different cell groups may contain serving cells of different RATs.

With regard to Dual Connectivity (DC) in LTE, E-UTRAN supports DC operation whereby a multiple Rx/Tx UE in RRC_CONNECTED is configured to utilize radio resources provided by two distinct schedulers, located in two eNBs connected via a non-ideal backhaul over the X2 interface (see 3GPP TS 36.300). eNBs involved in DC for a certain UE may assume two different roles: an eNB may either act as a Master node (MN) or as a Secondary Node (SN). In DC, a UE is connected to one MN and one SN.

In LTE DC, the radio protocol architecture that a particular bearer uses depends on how the bearer is set up. Three bearer types exist: Master Cell Group (MCG) bearer, Secondary Cell Group (SCG) bearer, and split bearers. Radio Resource Control (RRC) is located in MN and Signaling Radio Bearers (SRBs) are always configured as MCG bearer type and therefore only use the radio resources of the MN.

FIG. 1 illustrates an example of the LTE DC User Plane (UP).

LTE-NR DC (also referred to as LTE-NR tight interworking) is currently being discussed for Release 15. In this context, the major changes from LTE DC are: (1) the introduction of split bearer from the SN (known as SCG split bearer); (2) the introduction of split bearer for RRC; and (3) the introduction of a direct RRC from the SN (also referred to as SCG SRB or SRB3).

FIGS. 2 and 3 illustrate the UP and Control Plane (CP) architectures for LTE-NR tight interworking. Specifically, FIG. 2 illustrates the UP architecture for LTE-NR tight interworking. FIG. 3 illustrates the CP architecture for LTE-NR tight interworking.

The SN is sometimes referred to as SgNB (where gNB is an NR base station), and the MN as MeNB in case the LTE is the master node and NR is the secondary node. In the other case where NR is the master and LTE is the secondary node, the corresponding terms are SeNB and MgNB.

Split RRC messages are mainly used for creating diversity, and the sender can decide to either choose one of the links for scheduling the RRC messages, or it can duplicate the message over both links. In the DL, the path switching between the MCG or SCG legs or duplication on both is left to network implementation. On the other hand, for the UL, the network configures the UE to use the MCG, SCG or both legs. The terms "leg" and "path" are used interchangeably throughout this document.

The following terminologies are used throughout this text to differentiate different DC scenarios:
 DC: LTE DC (i.e., both MN and SN employ LTE)
 EN-DC: LTE-NR dual connectivity where LTE is the master and NR is the secondary
 NGEN-DC: LTE-NR dual connectivity where LTE connected to 5GC is the master and NR is the secondary
 NE-DC: LTE-NR dual connectivity where NR is the master and LTE is the secondary
 NR-DC (or NR-NR DC): both MN and SN employ NR
 MR-DC (multi-RAT DC): a generic term to describe where the MN and SN employ different RATs (EN-DC and NE-DC are two different example cases of MR-DC)

In E-UTRAN-NR DC, the master cell group contains at least E-UTRA PCell while the secondary cell group contains at least NR PSCell. In this example, master CG and secondary CG are managed by the eNB and gNB respectively.

In NR-E-UTRAN DC, the master cell group contains at least NR PCell while secondary cell group contains at least LTE PSCell. In this example master CG and secondary CG are managed by the gNB and eNB, respectively.

Inter-frequency measurements in LTE are conducted during periodic inter-frequency measurement gaps, which are configured in such a way that each gap starts at a System Frame Number (SFN) and subframe meeting the following conditions:
 SFN mod T=FLOOR(gapOffset/10);
 subframe=gapOffset mod 10;

with T=MGRP/10, where MGRP stands for "measurement gap repetition period." E-UTRAN must provide a single measurement gap pattern with constant gap duration for concurrent monitoring of all frequency layers and RATs. Two configurations are supported by the UE, with MGRP of 40 and 80 ms, both with the measurement gap length (MGL) of 6 milliseconds (ms). In practice, due to the switching time, this leaves less than 6 but at least 5 full subframes for measurements within each such measurement gap. Shorter MGL has been recently also standardized in LTE.

In LTE, measurement gaps are configured by the network to enable measurements on the other LTE frequencies and/or other RATs. The gap configuration is signalled to the UE over RRC protocol as part of the measurement configuration. The gaps are common (i.e., shared by) for all frequencies, but the UE can measure only one frequency at a time within each gap.

With regard to inter-frequency measurements and measurement gaps in NR and EN-DC, the 3rd Generation Partnership Project (3GPP) has agreed that in NR there will be four MGRPs (20 ms, 40, 80 ms, and 160 ms) and six options of MGL. In total, there will be 24 gap patterns.

In the context of EN-DC, two frequency ranges are important to consider: FR1 (sub 6 Ghz) and FR2 (above 24 Ghz). LTE operates in FR1, while NR could operate in both FR1 and FR2. Depending on implementation, a UE may have one RF chain for both FR1 and FR2 or a separate chain for each. In case of separate chain, inter-frequency measurement on one will not affect the transmission/reception on the other, while in the case of a common chain, measurements on one frequency range will require measurement gap and hence interruption of transmission/reception on the other. Thus, for the case of the separate RF chain, the UE could be configured with independent and different gap patterns, one for frequency of FR1, and one for frequency of FR2. On the other hand, for the common RF chain, a UE should be configured with one common (per UE) measurement gap.

Whether a UE supports a separate or common RF chain for FR1 and FR2 is communicated to the network as part of the UE capability information exchange.

Measurement coordination in EN-DC, MR-DC, and NN-DC is now described.

In EN-DC, if SRB3 is configured, the SN can directly configure the UE with the SCG configuration (which could include measurement configurations). If SRB3 is not available/configured, the SN sends the SCG configuration to the MN, the MN embeds it in an MN RRC message, and forwards it to the UE.

The main reason to have distributed measurement configurations were different mobility management of LTE and NR and also, to some extent, latency aspects. Thus, supporting both SRB3 for the SN node (NR) and allowing the SN to configure the measurement separately (without involving the MN) can speed up the measurement configuration and reporting related to the SCG. SRB3, since it uses NR radio, may allow faster transmission than the corresponding LTE SRB. Also, the backhaul link between MN and SN may be congested, which could negatively affect both the measurement reporting and new measurement configurations.

A decentralized measurement configuration (i.e., each node configures the measurements separately) can be beneficial for the case where the MN and SN nodes operate on different RATs with different measurement capabilities and for deployments when there could be a large congestion/delay over Xn.

The argument for having lower latency is still relevant in the case of NGEN-DC, but not as important when we have NE-DC (as the MN radio is the one with the highest capacity/lower latency). However, the other arguments are still valid (i.e., NR and LTE have different mobility management and use different RRC protocols). Therefore, the MR-DC measurement framework should be based on the EN-DC solution, where both MN and SN can construct the measurement configuration and receive the measurement reports separately.

For the case of NN-DC, the arguments of having separate measurements (and reports) for both the MN and SN for latency and mobility management purposes still apply (i.e., due to the fact that in this case we use only NR nodes). Thus, a reasonable solution would be to still apply the EN-DC solution for NN-DC and have a sort of harmonization regarding the measurements configuration (and reporting) for all the DC options.

In EN-DC, measurement gaps can be configured either per UE (i.e., a single measurement gap used for both FR1 and FR2 frequencies), or separate gaps are configured for FR1 and FR2 frequencies. In the case of per UE gap, the MN configures the measurement gap, while for the case of per FR gaps, the MN configures the FR1 gap while the SN configures the FR2 gaps. The main reason for such a division was that MN can only configure FR1 serving cells (and thus its operation is impacted only by FR1 gaps), while FR2 gap affects the operation of only FR2 serving cells, which only the SN can configure. In the case of per UE gap, SN informs the MN about the measurements that it is configuring and the serving cells it is adding/removing, so that MN can configure the appropriate measurement gap.

In the case of per FR gap, SN informs the MN about measurement configurations and serving cells related to FR1, and MN informs the SN about measurement configurations on FR2. MN configures the FR1 gap and communicates it to the SN, and SN configures the FR2 gaps and communicates it to the MN.

For the case of NGEN-DC, the same principles are applicable as there is no difference between EN-DC and NGEN-DC from the measurement aspect (i.e., as difference between the two is where the MN, LTE, is connected to EPC or 5GC).

There currently exist certain challenge(s). For example, when it comes to NE-DC and NR-NR DC, the measurement gap configuration principles of EN-DC and NGEN-DC described above can be applied if a per UE gap is to be configured (i.e., the MN configures the required gap). However, for per FR gaps, the EN-DC/NGEN-DC principle cannot be applied directly because: (1) in NE-DC, MN (which is the NR node) can configure serving cells that can employ FR1 or FR2 frequencies, while SN (LTE node) can configure only FR1 serving cells (which is the opposite of EN-DC and NG-EN DC); and (2) in NR-NR DC, both MN and SN (which are NR nodes) can configure serving cells that can employ FR1 or FR2 frequencies.

Consider the NE-DC case as an example. The MN can configure both FR1 and FR2 gaps (Option A) or the MN can configure the FR2 gaps and the SN can configure the FR1 gap (Option B). Option A is the simplest solution, and it will make the operation in both per UE and per FR cases to be similar (i.e., MN always sets the gap or gaps required). Option B is the reverse case of EN-DC, due to the fact that FR2 is now the MN's concern while FR1 is a concern for both MN and SN.

The problem with Option B is that it doesn't apply when the UE is not in DC mode (as the UE could need both FR1 and FR2 gaps even when it is not in DC), and assumes that SN configures the FR1 gaps. That is, in non-DC case, case A needs to be employed anyways, so choosing Option B means both Options A and B have to be supported.

FIG. 4 illustrates the SN triggered SN modification procedure as captured in 3GPP TS 37.340, which will be used as a reference for the described aforementioned scenario. Specifically, FIG. 4 illustrates the SN Modification procedure when SN initiated with MN involvement.

In the following, the different network behaviors are analyzed for the case when Option A above is employed.

When the SN decides to configure measurements that require FR1 gaps, it includes the measurement configuration intended for the UE in the CG-Config that is part of the SN/SgNB Modification Required message, and it also indicates to the MN, in the measConfigSN information element (IE), the frequencies that it is configuring the UE with. Then the MN has to prepare the required gap configuration and communicate this to the UE and the SN.

Currently, there is no possibility to report this to the SN in the SN/SgNB confirmation message, as the CG-ConfigInfo that is used to indicate gaps for the SN is not included in the SgNB confirmation message. This issue is not discussed in detail herein, but it can be resolved by the inclusion of the CG-ConfigInfo in the SN/SgNB Modification confirm message or the usage of the optional messages 2/3 above (i.e., embedded MN initiated SN modification within the SN initiated MN modification) to communicate the gaps to the SN.

Since the SN doesn't know about the exact measurement gap that is going to be configured by the MN until it gets the message 6 (in case SgNB/SN modification confirm is enhanced) or message 2 (in case embedded MN initiated SN modification is used), it may have to refrain from scheduling the UE at all on FR1 frequencies to avoid the possibility of data loss (i.e., SN sending data, but UE not able to receive due to gaps, especially in the case of the gaps being included in message 6, which is sent after the UE has been configured with the gaps from the MN in message 4).

Thus, Option A could lead to unnecessary signaling and possible loss of UE throughput.

SUMMARY

Certain aspects of the present disclosure and their embodiments may provide solutions to these or other challenges.

According to certain embodiments, a method by a master network node for measurement gap configuration includes establishing a connection with a wireless device operating in dual connectivity with the master network node and a secondary network node. The master network node operates on a NR wireless network and the secondary network node operates on a LTE network. The measurement gap configuration is configured on a per frequency basis for at least a first frequency and a second frequency on the NR wireless network. The measurement gap configuration is configured on a per frequency basis for the first frequency on the LTE network. The method further incudes configuring, by the master network node, the wireless device with at least one measurement gap for the second frequency when the master network node configures a measurement that requires the at least one measurement gap.

According to certain embodiments, a master network node for measurement gap configuration includes processing circuitry configured to establish a connection with a wireless device operating in dual connectivity with the master network node and a secondary network node. The master network node operates on a NR wireless network and the secondary network node operates on a LTE network. The measurement gap configuration is configured on a per frequency basis for at least a first frequency and a second frequency on the NR wireless network. The measurement gap configuration is configured on a per frequency basis for the first frequency on the LTE network. The wireless device is configured with at least one measurement gap for the second frequency when the master network node configures a measurement a measurement that requires the at least one measurement gap.

According to certain embodiments, a method by a master network node for measurement gap configuration includes establishing a connection with a wireless device operating in dual connectivity with the master network node and a secondary network node. The master network node and the secondary network node operate on a NR wireless network. The measurement gap configuration is configured on a per frequency basis for at least a first frequency and a second frequency on the NR wireless network. The method further includes configuring, by the master network node, the wireless device with at least one measurement gap for the first frequency or the second frequency that requires the at least one measurement gap.

According to certain embodiments, a master network node for measurement gap configuration includes processing circuitry configured to establish a connection with a wireless device operating in dual connectivity with the master network node and a secondary network node. The master network node and the secondary network node operate on a NR wireless network. The measurement gap configuration is configured on a per frequency basis for at least a first frequency and a second frequency on the NR wireless network. The processing circuitry is further configured to configure, by the master network node, the wireless device with at least one measurement gap for the first frequency or the second frequency that requires the at least one measurement gap.

According to certain embodiments, a method by a wireless device operating according to a measurement gap configuration includes establishing a connection with a master network node while operating in dual connectivity with the master network node and a secondary network node. The master network node operates on a NR wireless network and the secondary network node operates on a LTE network. The measurement gap configuration is configured on a per frequency basis for at least a first frequency and a second frequency on the NR wireless network. The measurement gap configuration is configured on a per frequency basis for the first frequency on the LTE network. The method further includes receiving a measurement gap configuration for the first frequency from the master network node, releasing a previous measurement gap configuration for the first frequency, and using the measurement gap configuration for the first frequency for a new gap whether the new gap was received or generated from a same or a different network node that configured a previous measurement gap configuration for a previous measurement gap.

According to certain embodiments, a wireless device operates according to a measurement gap configuration and includes processing circuitry operable to establish a connection with a master network node while operating in dual connectivity with the master network node and a secondary network node. The master network node operates on a NR wireless network and the secondary network node operates on a LTE network. The measurement gap configuration is configured on a per frequency basis for at least a first frequency and a second frequency on the NR wireless network. The measurement gap configuration is configured on a per frequency basis for the first frequency on the LTE network. The processing circuitry is further configured to receive a measurement gap configuration for the first frequency from the master network node; release a previous measurement gap configuration for the first frequency, and use the measurement gap configuration for the first frequency for a new gap whether the new gap was received or generated from a same or a different network node that configured a previous measurement gap configuration for a previous measurement gap.

Certain embodiments may provide one or more of the following technical advantage(s). As one example, certain embodiments may advantageously provide a robust way to configure measurements and measurement gaps in NE-DC and NR-NR DC scenarios. As another example, certain embodiments may advantageously provide a robust way to configure shared configuration parameters for a UE operating in DC. As still another example, certain embodiments may advantageously enable a robust measurement gap co-ordination mechanism in NE-DC and NR-NR DC that prevents unnecessary signaling and ensures there will be no UE throughput loss during measurement gap configuration.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
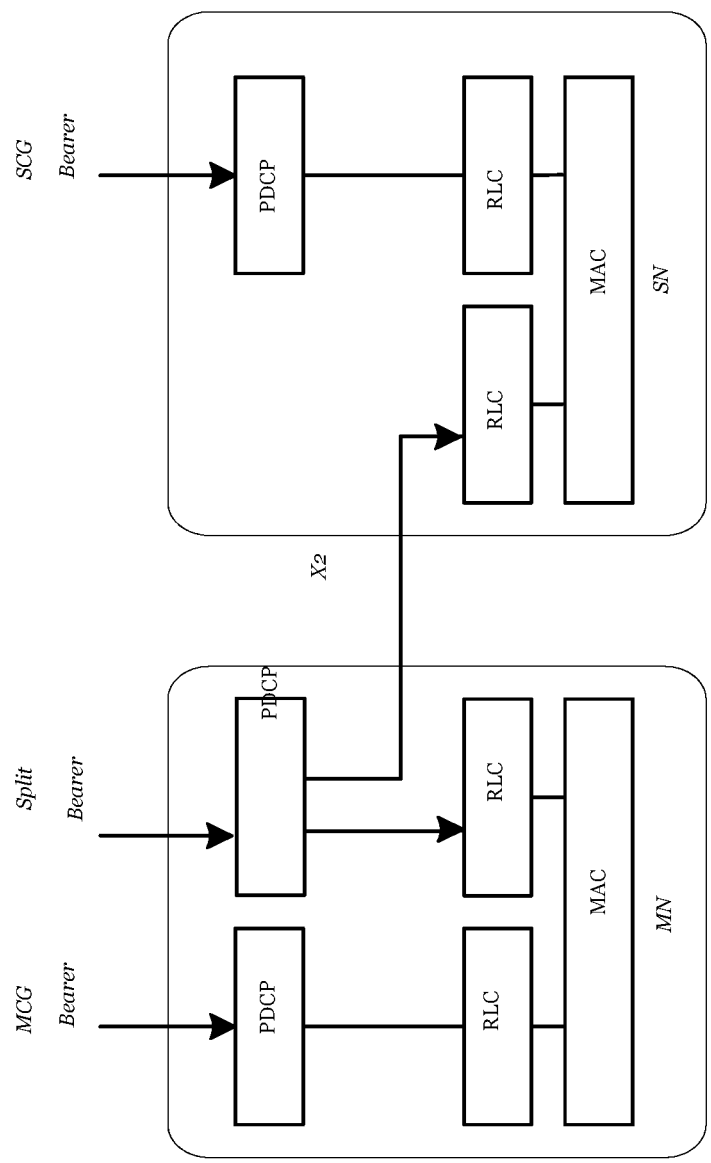
FIG. 1 illustrates an example of the LTE Dual Connectivity (DC) User Plane (UP)
Figure 2:
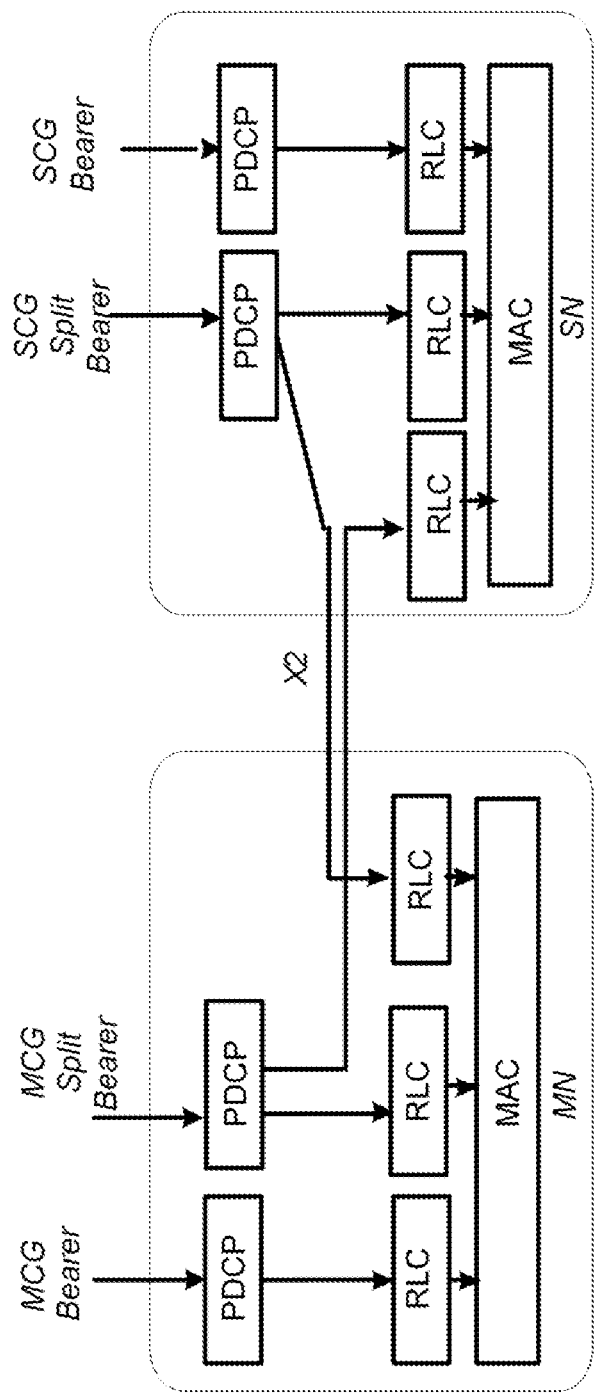
FIG. 2 illustrates the UP architecture for LTE-NR tight interworking.
Figure 3:
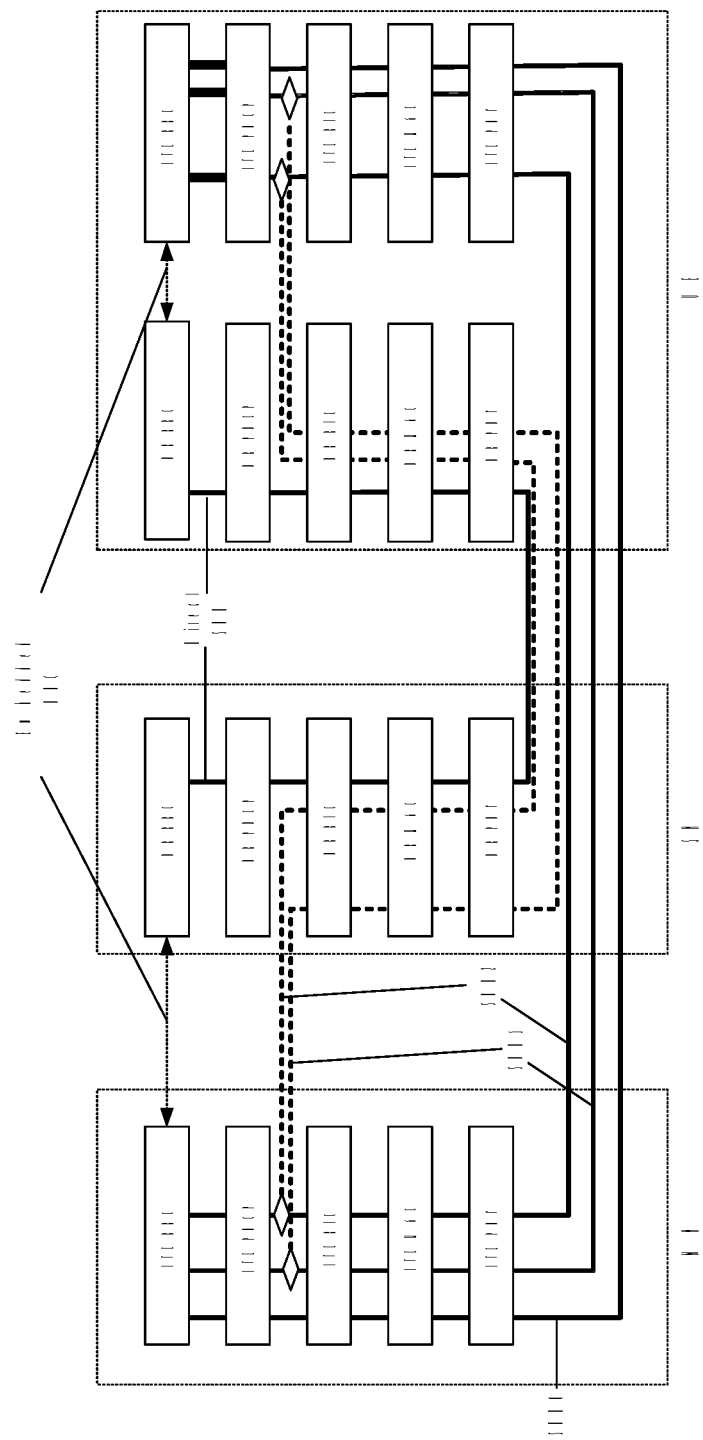
FIG. 3 illustrates the CP architecture for LTE-NR tight interworking.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In certain embodiments, a mechanism is disclosed that provides a more robust measurement gap co-ordination in NE-DC and NR-NR scenarios. In other words, the present disclosure contemplates various embodiments that provide a robust measurement gap co-ordination mechanism for scenarios where NE-DC or NR-NR DC is configured.

There are, proposed herein, various embodiments which address one or more of the issues disclosed herein. Certain embodiments may apply to a NE-DC scenario. For example, according to one example embodiment, for NE-DC, for the case of per FR gap configurations, a mechanism for the MN to configure the FR2 gaps is disclosed.

According to another example embodiment, for NE-DC, for the case of per FR gap configurations, a mechanism for the first node (MN or SN) that configures a measurement on FR1 that requires a gap to configure the gap and communicate it to the other node is disclosed.

Some additional example embodiments follow for an NE-DC scenario:

Example Embodiment 1: For NE-DC, for the case of per FR gap configurations, the MN configures the UE with FR2 measurement gaps, when it configures measurement that require such a gap.

Example Embodiment 2: For NE-DC, for the case of per FR gap configurations, the first node (MN or SN) that configures the UE with a measurement on FR1 that requires a gap also configures the UE with the appropriate gap.

Example Embodiment 3: For NE-DC, either the MN or SN can modify the measurement gap configuration for FR1 that was configured by the MN or SN according to example embodiment 2.

Example Embodiment 4: A method according to example embodiments 2 or 3, where the measurement gap is communicated to the UE in an RRC reconfiguration message directly from the node configuring the gap.

Example Embodiment 5: A method according to example embodiments 2 or 3, where the measurement gap is communicated to the UE in an RRC reconfiguration message from the MN that includes the measurement and gap configuration from the SN.

Example Embodiment 6: A method according to example embodiment 5, where the measurement and measurement gap configuration from the SN that is included in the RRC reconfiguration message from the MN is within an RRC reconfiguration message that was generated at the SN.

Example Embodiment 7: A method according to example embodiment 5, where the measurement gap configuration from the SN that is included in the RRC reconfiguration message from the MN is an information element or elements, which is/are generated at the SN, that contains the measurement and measurement gap configuration.

Example Embodiment 8: A method according to any of example embodiments 1-7, where the node that configures the measurement gaps communicates the measurement gap configuration to the other node.

Example Embodiment 9: A method according to any of example embodiments 1-8, where the MN, upon configuring or releasing a serving cell on FR1 frequencies, communicates it to the SN.

Example Embodiment 10: A method according to any of example embodiments 1-9, where the MN, upon configuring a measurement on FR1 frequencies, communicates it to the SN Example Embodiment 11: A method according to any of example embodiments 1-10, where the SN, upon configuring or releasing a serving cell on FR1 frequencies, communicates it to the MN.

Example Embodiment 12: A method according to any of example embodiments 1-11, where the SN, upon configuring a measurement on FR1 frequencies, communicates it to the MN Example Embodiment 13: A method according to any of example embodiments 1-12, where the communication between the two nodes is via the Xn interface.

Example Embodiment 14: A method according to any of example embodiments 1-13, where the UE, upon receiving an FR1 gap configuration, releases the previous FR1 gap configuration and starts using the new gap, whether the new gap was received/generated from the same node that configured the previous gap or the new gap was received/generated by a different node that configured the previous gap.

Certain embodiments may apply to a NR-NR DC scenario. For example, according to another example embodiment, for NR-NR DC, for the case of per FR gap configurations, a mechanism for the first node (MN or SN) that configures a measurement on FR1 or FR2 that requires gaps to configure the gap and communicate it to the other node is disclosed.

Some additional example embodiments follow for an NR-NR DC scenario:

Example Embodiment A1: For NR-NR DC case, for the case of per FR gap configurations, the first node (MN or SN) that configures the UE with a measurement on FR1 or FR2 that requires a gap also configures the UE with the appropriate gap.

Example Embodiment A2: For NR-NR DC, either the MN or SN can modify the measurement gap configuration for FR1 or FR2 that was configured by the MN or SN according to example embodiment A1.

Example Embodiment A3: A method according to example embodiments A1 or A2, where the measurement gap is communicated to the UE in an RRC reconfiguration message directly from the node configuring the gap.

Example Embodiment A4: A method according to example embodiments A1 or A2, where the measurement gap is communicated to the UE in an RRC reconfiguration message from the MN that includes the measurement and gap configuration from the SN.

Example Embodiment A5: A method according to example embodiment A4, where the measurement and measurement gap configuration from the SN that is included in the RRC reconfiguration message from the MN is within an RRC reconfiguration message that was generated at the SN.

Example Embodiment A6: A method according to example embodiment A4, where the measurement gap configuration from the SN that is included in the RRC reconfiguration message from the MN is an information element or elements, which is/are generated at the SN, that contains the measurement and measurement gap configuration.

Example Embodiment A7: A method according to any of example embodiments A1-A6, where the node that configures the measurement gaps communicates the measurement gap configuration to the other node.

Example Embodiment A8: A method according to any of example embodiments A1-A7, where the MN, upon configuring or releasing a serving cell on FR1 or FR2 frequencies, communicates it to the SN.

Example Embodiment A9: A method according to any of example embodiments A1-A8, where the MN, upon configuring a measurement on FR1 or FR2 frequencies, communicates it to the SN Example Embodiment A10: A method according to any of example embodiments A1-A9, where the SN, upon configuring or releasing a serving cell on FR1 or FR2 frequencies, communicates it to the MN.

Example Embodiment A11: A method according to any of example embodiments A1-A10, where the SN, upon configuring a measurement on FR1 or FR2 frequencies, communicates it to the MN Example Embodiment A12: A method according to any of example embodiments A1-A11, where the communication between the two nodes is via the Xn interface.

Example Embodiment A13: A method according to any of example embodiments A1-A12, where the UE, upon receiving an FR1 or FR2 gap configuration, releases the previous FR1 gap configuration and starts using the new gap, whether the new gap was received/generated from the same node that configured the previous gap or the new gap was received/generated by a different node that configured the previous gap.

Certain additional example embodiments may apply to a more generalized scenario.

Example Embodiment B1: A method where a UE that is operating in dual connectivity and having a common configuration (e.g., measurement configuration, measurement gap configuration, power limitations, DRX mode, etc.) that can be shared by the two protocol stacks and/or Tr/Rx units.

Example Embodiment B2: A method according to example embodiment B1, where the UE, upon receiving a new configuration, updates the configuration and starts using the updated configuration, whether the new configuration was received/generated from the same node that configured the previous configuration or the new configuration was received/generated by a different node that configured the previous configuration.

Example Embodiment B3: A method according to example embodiment B2, where updating the configuration means releasing the old configuration and replacing it with a new configuration (e.g., full configuration).

Example Embodiment B4: A method according to example embodiment B2, where updating the configuration means applying the new configuration on top of the old configuration (e.g., delta configuration where the parts of the configuration that were not included in the new configuration are kept as before).

Example Embodiment B5: A method according to any of example embodiments B1-B4, where the MN and SN are using the same RAT.

Example Embodiment B6: A method according to any of example embodiments B1-B4, where the MN and SN are using the different RATs.

Example Embodiment B7: A method according to any of example embodiments B1-B6, where the MN and SN are connected to a CN that uses the same core network technology.

Example Embodiment B8: A method according to any of example embodiments B1 to B6, where the MN and SN are connected to a CN that uses the same core network technology.

Figure 5:
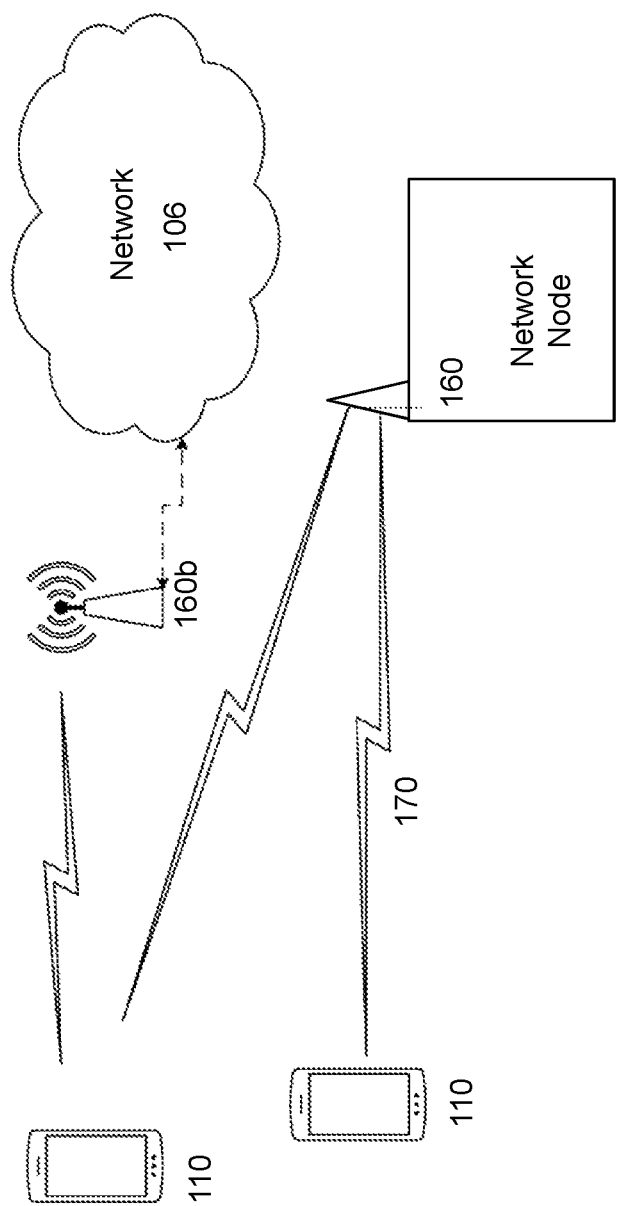
FIG. 5 illustrates an example wireless network for measurement gap configuration in NE-DC and NR-NR DC, according to certain embodiments.

FIG. 5 illustrates a wireless network in accordance with some embodiments. Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 106, network nodes 160 and 160b, and wireless devices 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (wireless device) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 6:
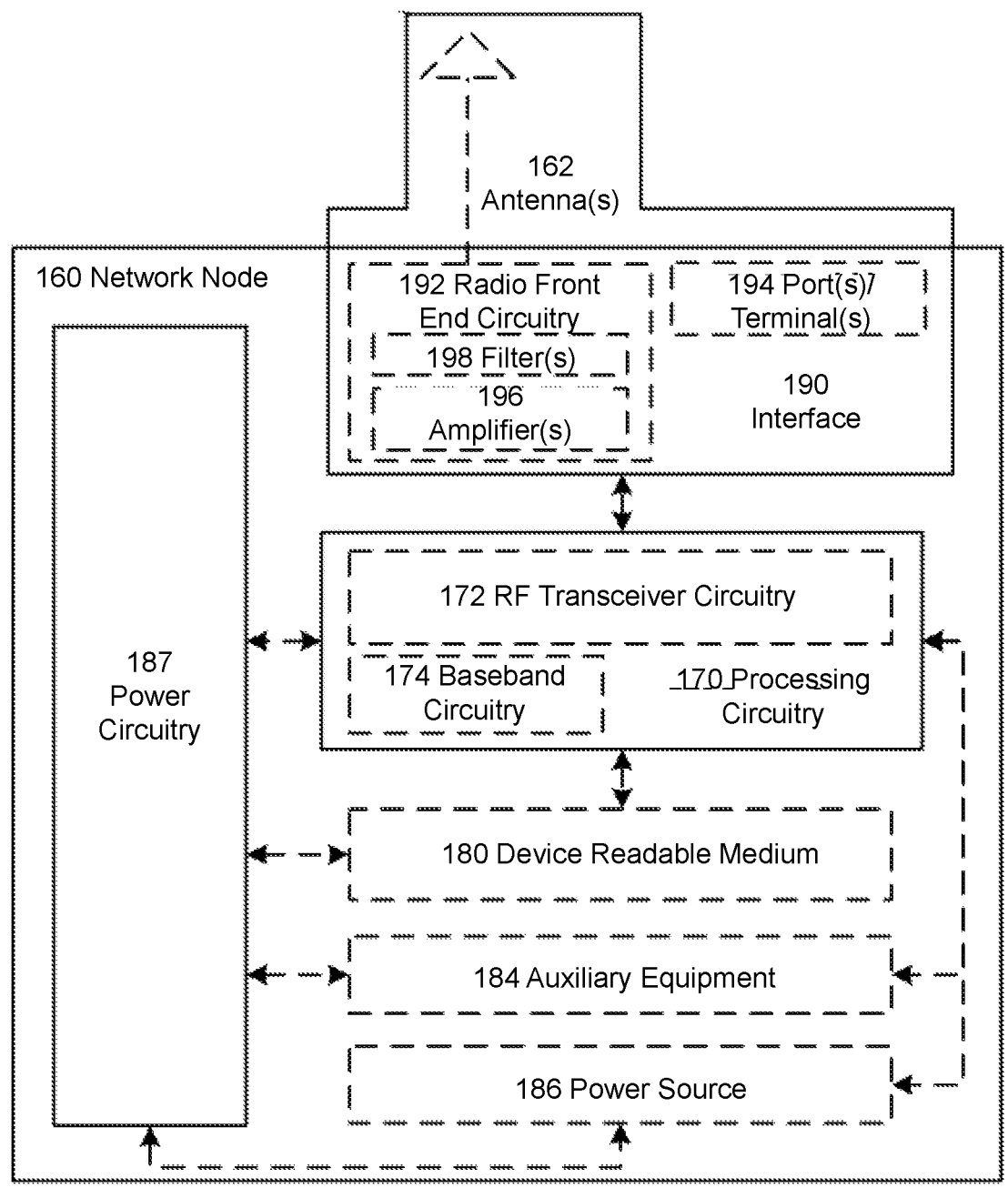
FIG. 6 illustrates an example network node for measurement gap configuration in NE-DC and NR-NR DC, according to certain embodiments.

FIG. 6 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NRNodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 160 includes processing circuitry 170, device readable medium 180, interface 190, auxiliary equipment 184, power source 186, power circuitry 187, and antenna 162. Although network node 160 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 6 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 7:
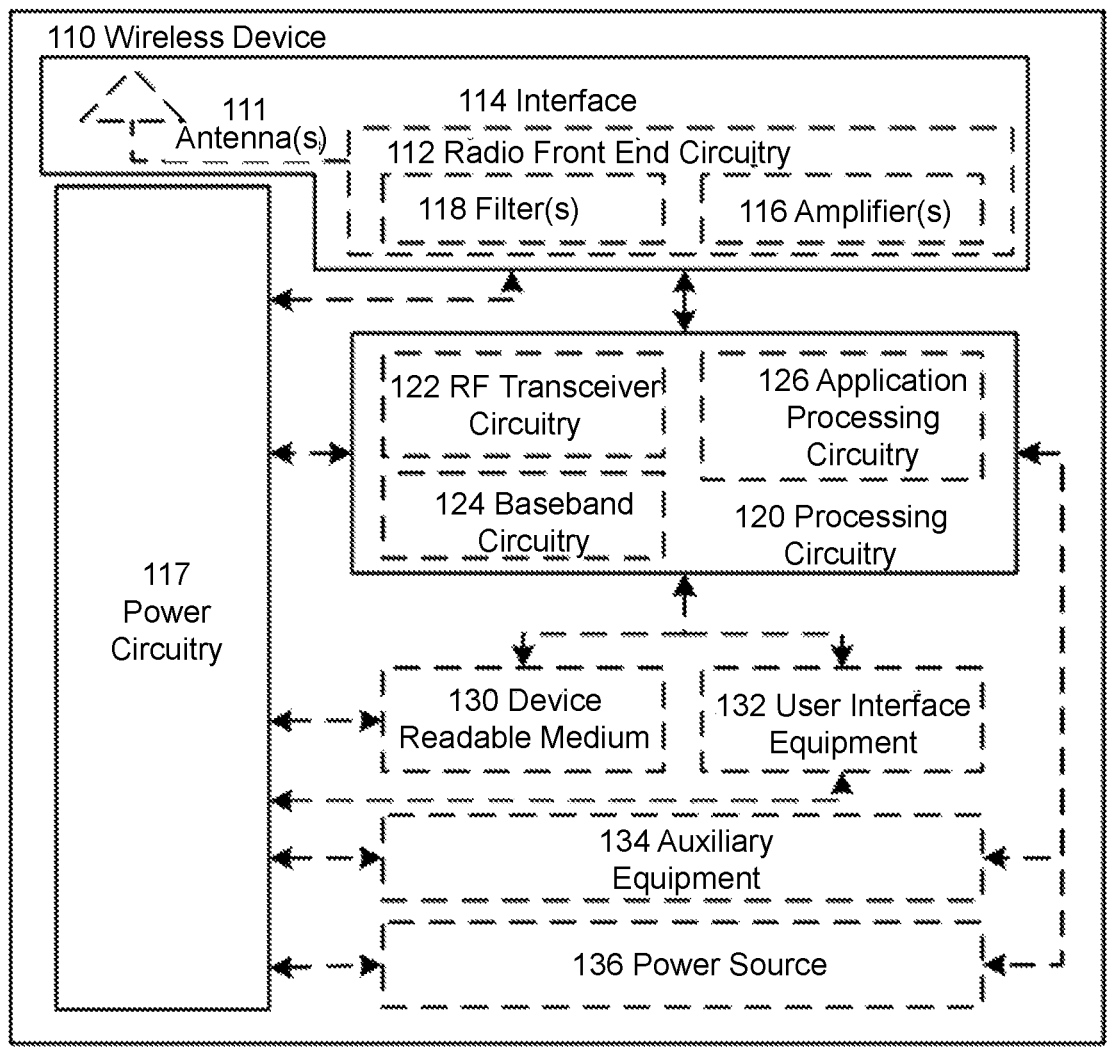
FIG. 7 illustrates an example wireless device for measurement gap configuration in NE-DC and NR-NR DC, according to certain embodiments.

FIG. 7 illustrates an example wireless device, according to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network, and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 8:
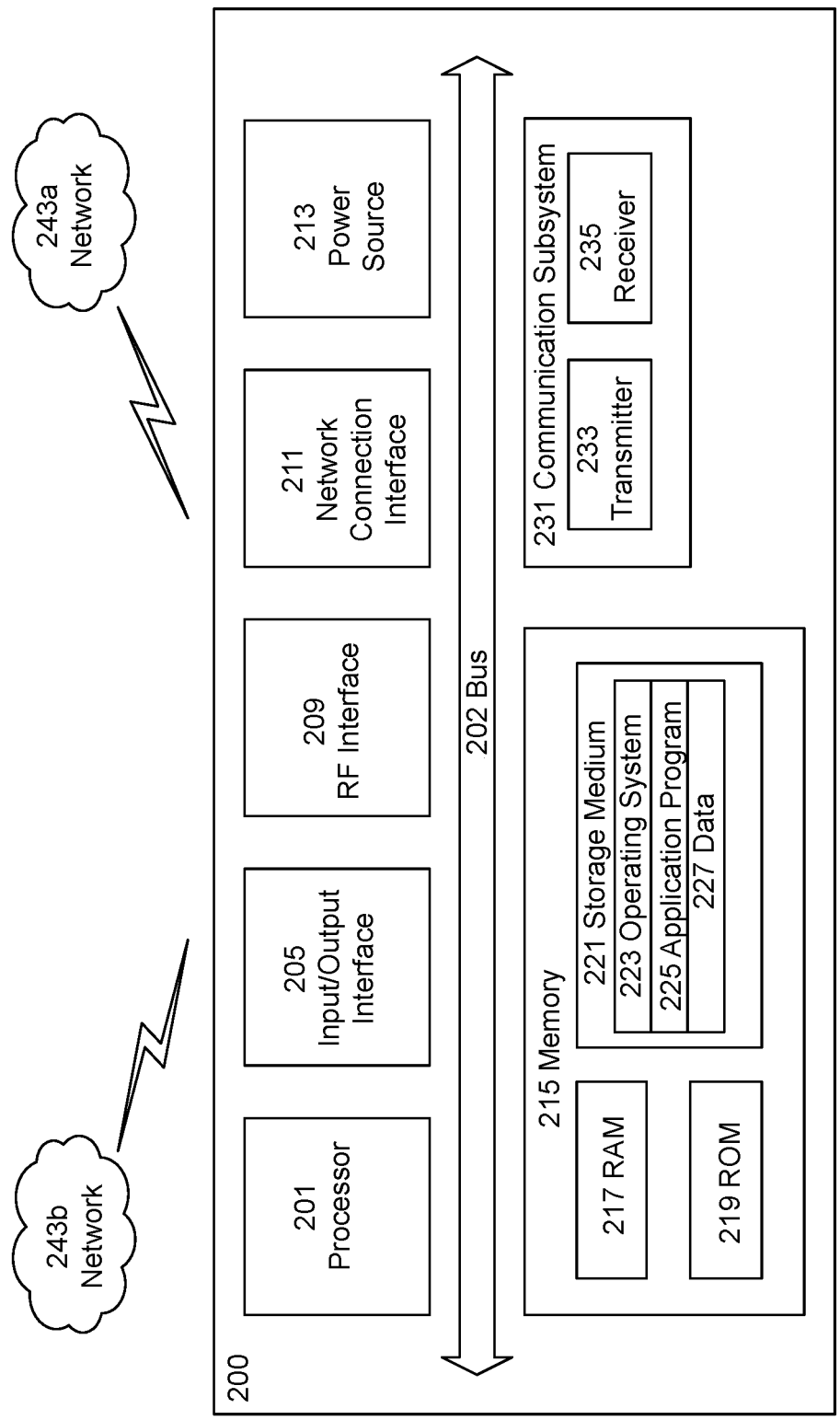
FIG. 8 illustrate an example user equipment, according to certain embodiments.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 8, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 8 is a UE, the components discussed herein are equally applicable to a wireless device, and vice-versa.

In FIG. 8, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 8, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 9:
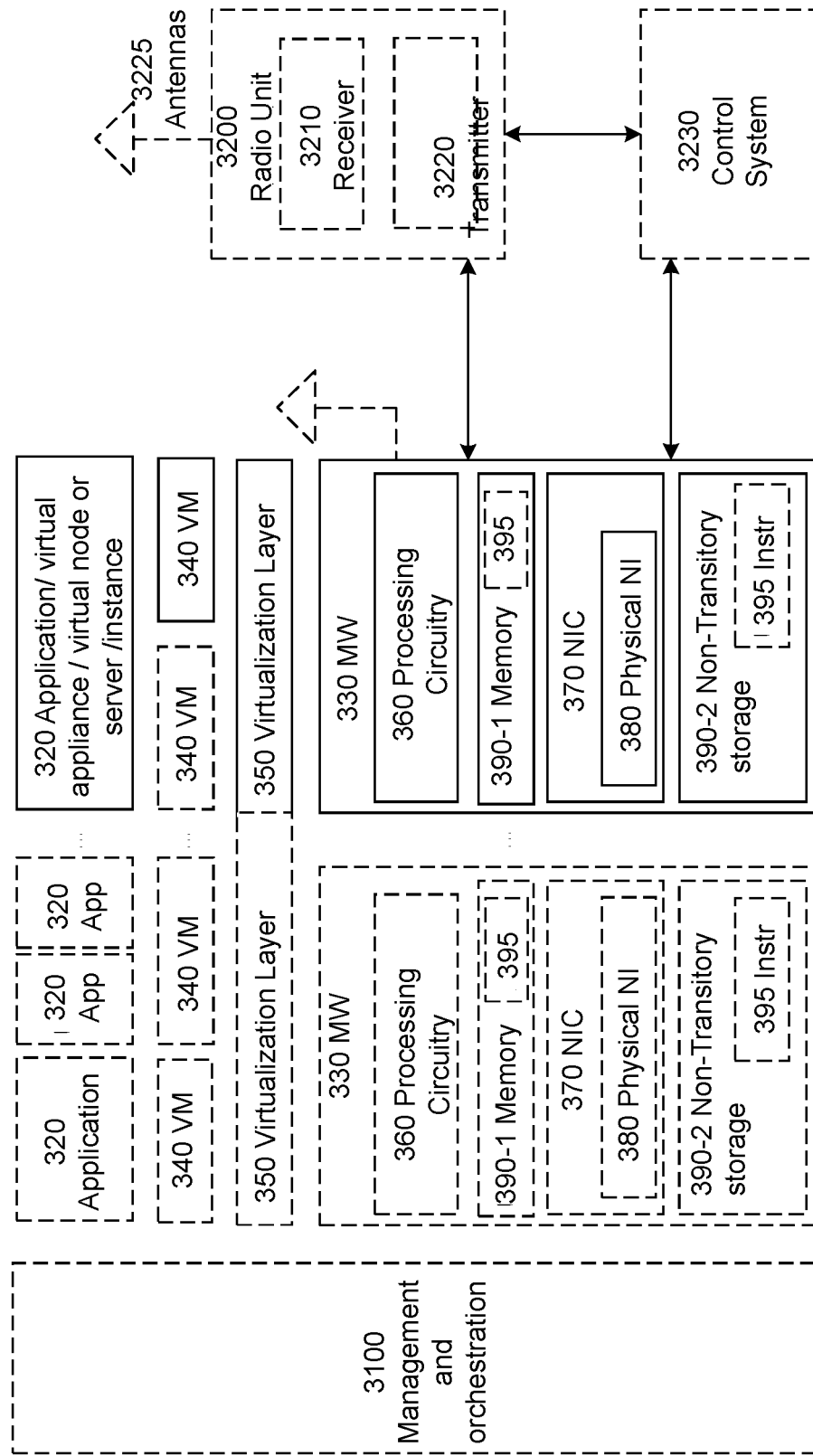
FIG. 9 illustrates a virtualization environment in which functions implemented by some embodiments may be virtualized, according to certain embodiments.

FIG. 9 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 9, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 9.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 10:
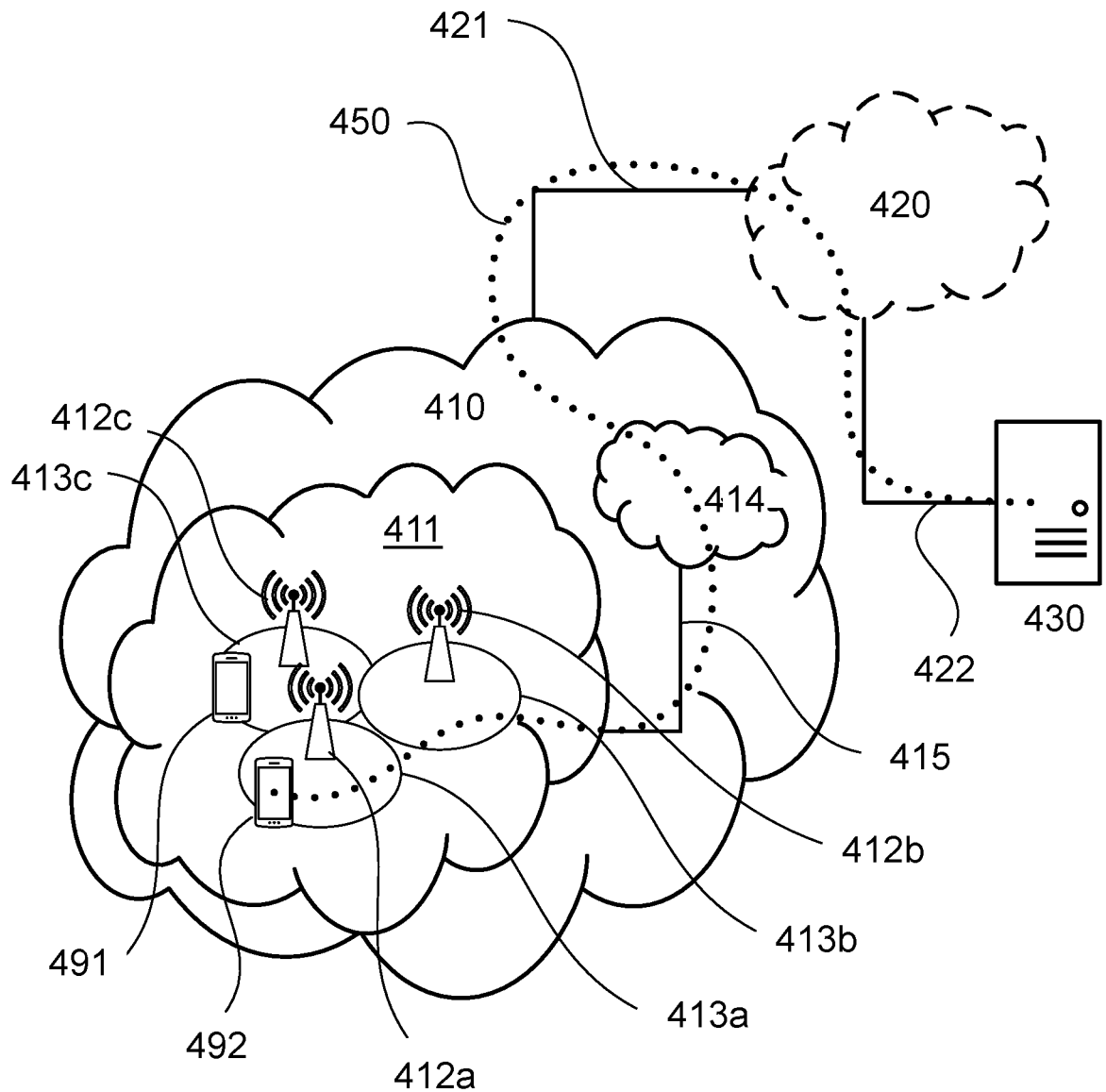
FIG. 10 illustrates a telecommunication network connected via an intermediate network to a host computer, according to certain embodiments.

With reference to FIG. 10, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 10 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 11:
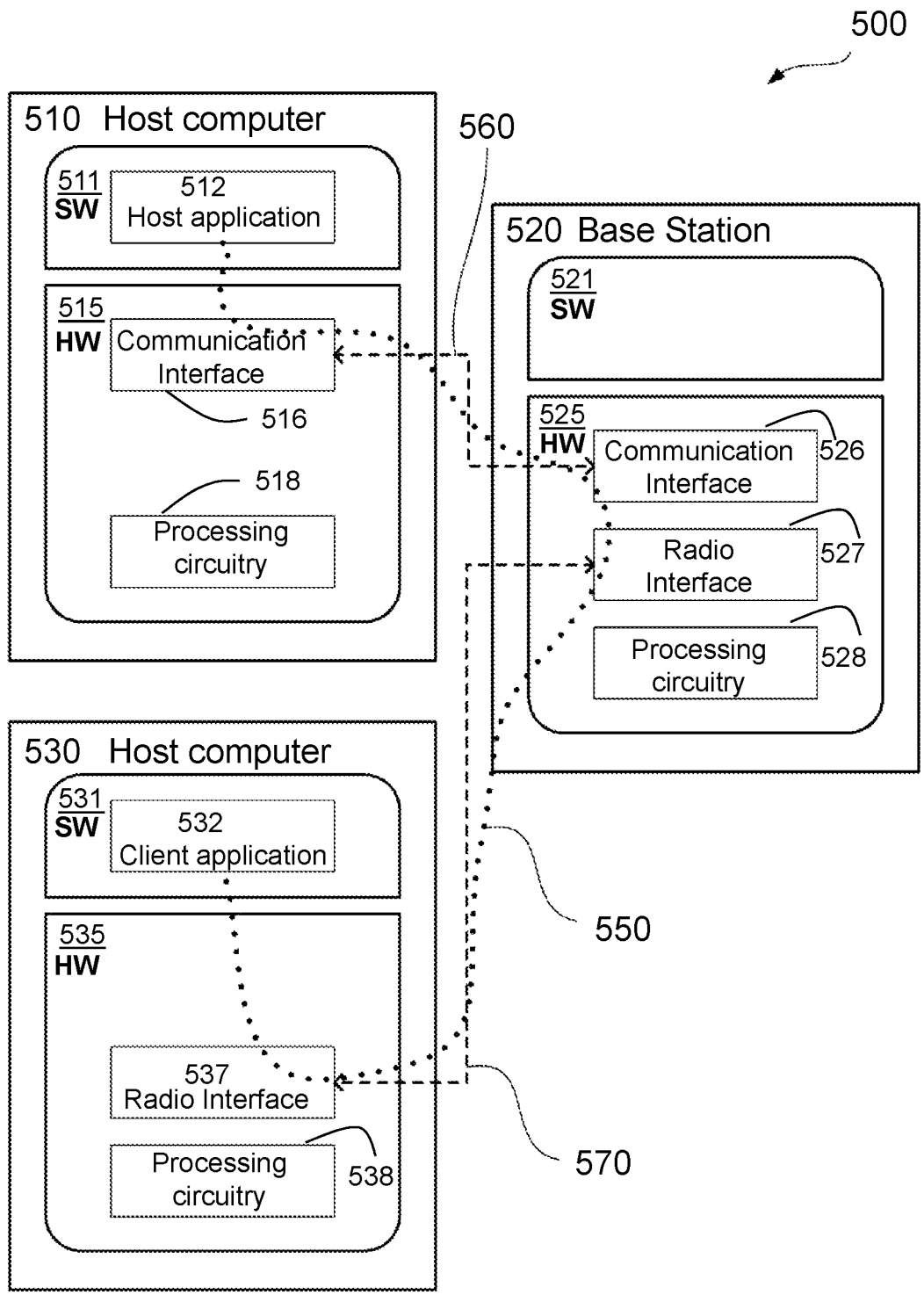
FIG. 11 illustrates a generalized block diagram of a host computer communicating via a base station with a user equipment over a partially wireless connection, according to certain embodiments.

FIG. 11 illustrates an example host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 11. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 11) served by base station 520. Communication interface 526 may be configured to facilitate connection 560 to host computer 510. Connection 560 may be direct or it may pass through a core network (not shown in FIG. 11) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 11 may be similar or identical to host computer 430, one of base stations 412a, 412b, 412c and one of UEs 491, 492 of FIG. 10, respectively. This is to say, the inner workings of these entities may be as shown in FIG. 11 and independently, the surrounding network topology may be that of FIG. 10.

In FIG. 11, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 12, 13:
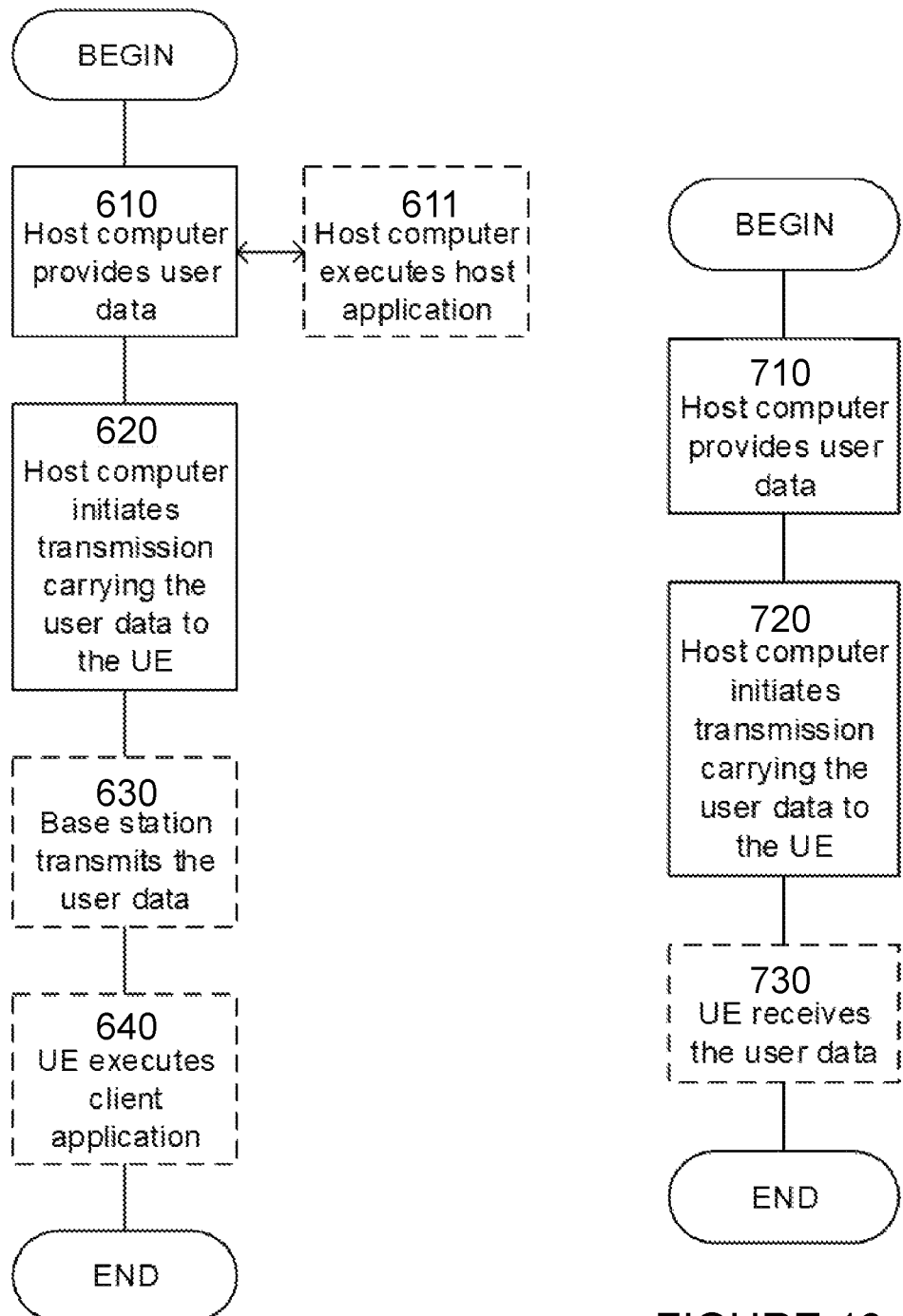
FIG. 12 illustrates a method implemented in a communication system, according to one embodiment.
FIG. 13 illustrates another method implemented in a communication system, according to one embodiment.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 14, 15:
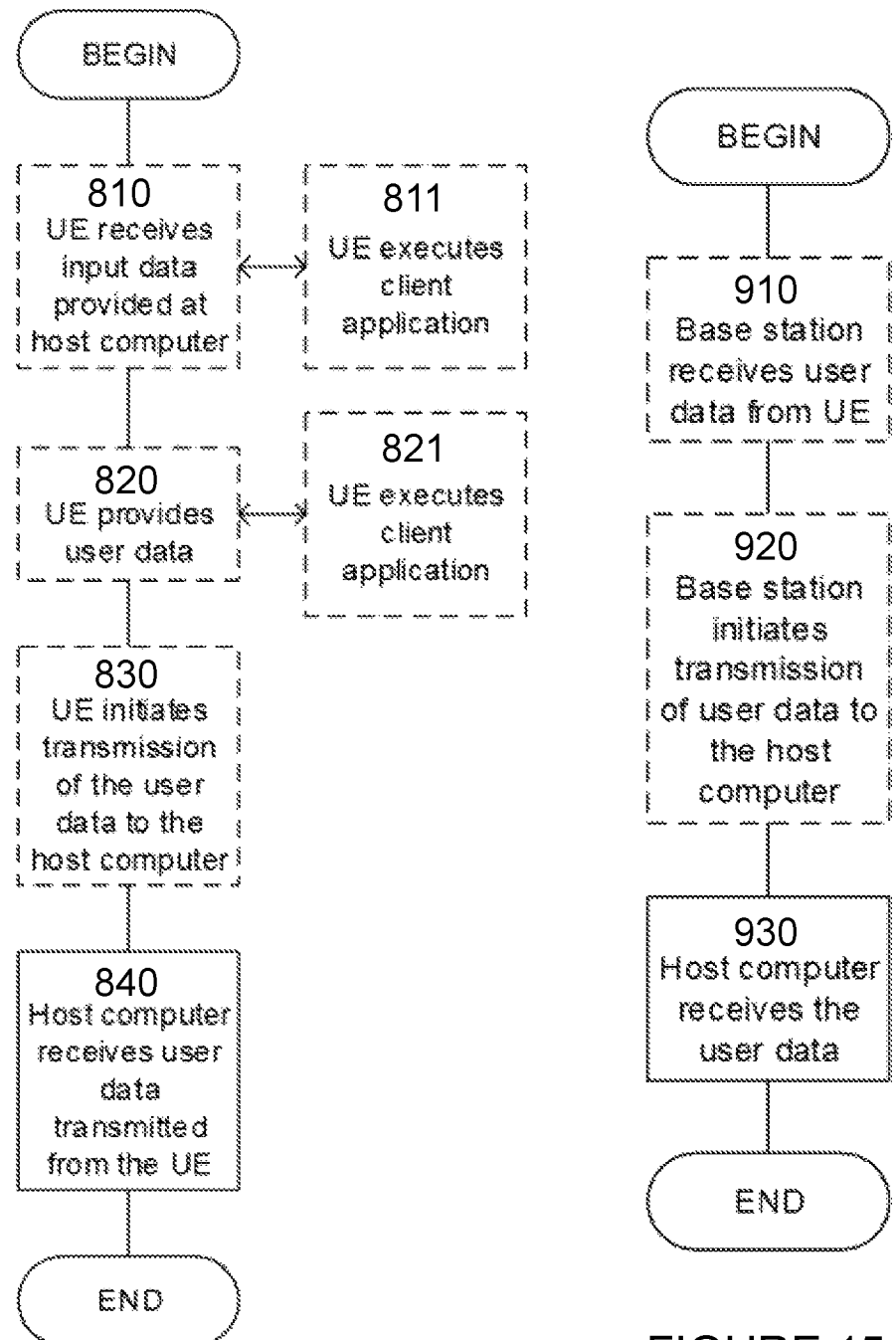
FIG. 14 illustrates another method implemented in a communication system, according to one embodiment.
FIG. 15 illustrates another method implemented in a communication system, according to one embodiment.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 16:
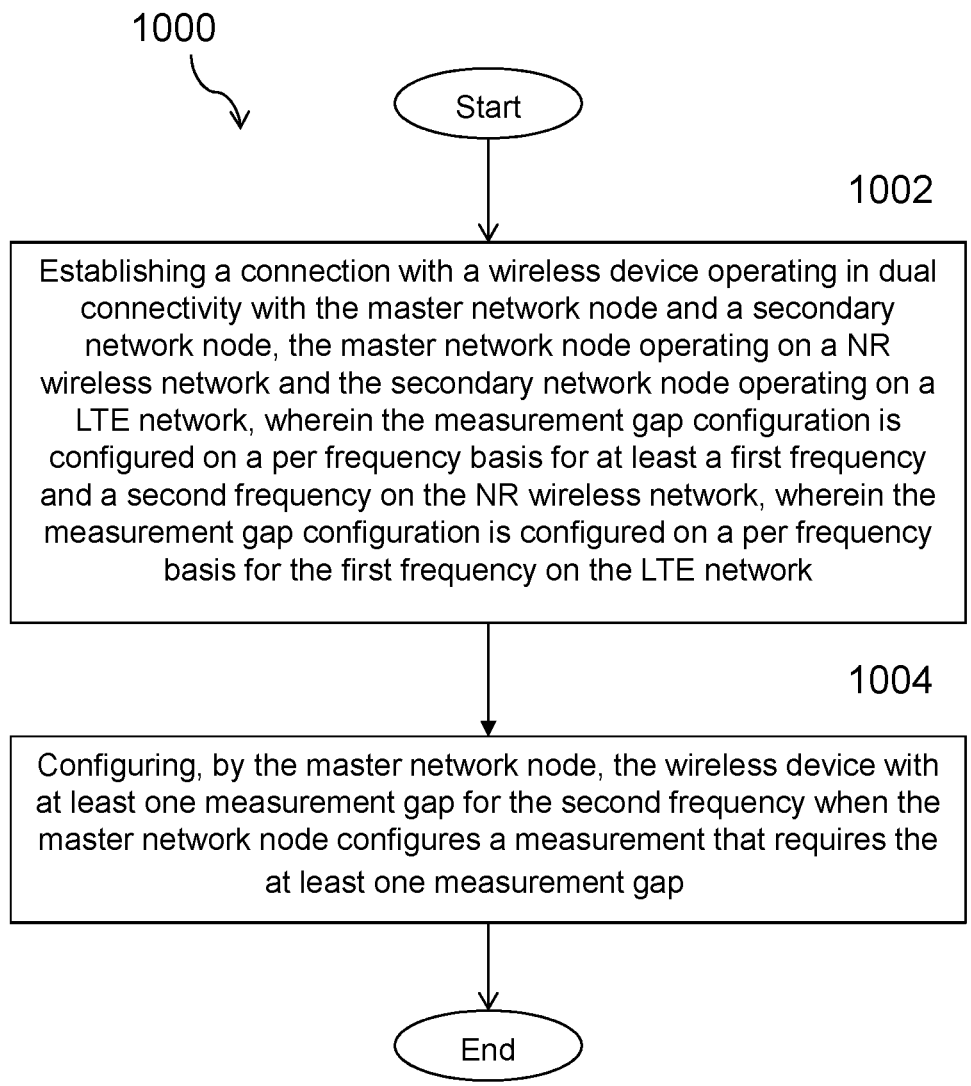
FIG. 16 illustrates an example method by a master network node for measurement gap configuration in NE-DC, according to certain embodiments.

FIG. 16 illustrates an example method 1000 by a master network node 160 for measurement gap configuration in NE-DC, according to certain embodiments. At step 1002, the master network node 160 establishes a connection with a wireless device 110 operating in dual connectivity with the master network node 160 and a secondary network node 160b. The master network node 160 operates on a NR wireless network and the secondary network node 160b operates on a LTE network. The measurement gap configuration is configured on a per frequency basis for at least a first frequency and a second frequency on the NR wireless network. Additionally, the measurement gap configuration is configured on a per frequency basis for the first frequency on the LTE network. At step 1004, the master network node 160 configures the wireless device 110 with at least one measurement gap for the second frequency when the master network node 160 configures a measurement that requires the at least one measurement gap.

In a particular embodiment, the method further includes performing at least one of:
configuring the wireless device 110 with at least one measurement gap for the first frequency when the master network node 160 is first to configure a measurement that requires the at least one measurement gap before the secondary network node 160b, and
receiving, from the secondary network node 160b, a configuration of the at least one measurement gap for the first frequency when the secondary network node 160b is first to configure a measurement that requires the at least one measurement gap for the first frequency before the master network node 160.

In a particular embodiment, the method further includes performing at least one of:
modifying, by the master network node 160, the at least one measurement gap for the first frequency, and
receiving, from the secondary network node 160b, a modification of the at least one measurement gap for the first frequency and modifying the at least one measurement gap for the first frequency based on the modification from the secondary network node 160b.

In a particular embodiment, the at least one measurement gap for the first frequency is communicated to the wireless device 110 in an RRC reconfiguration message directly from the node configuring the gap.

In a particular embodiment, the at least one measurement gap for the first frequency is received from the secondary node 160b and the method further includes transmitting, in a RRC reconfiguration message from the master network node 160 to the wireless device 110, the at least one measurement gap for the first frequency received from the secondary node 1160b. In a further particular embodiment, the RRC reconfiguration message was generated at the secondary node 160b. Alternatively, the RRC reconfiguration message may include at least one information element, which includes the at least one measurement gap for the first frequency as generated at the secondary network node 160b.

In a particular embodiment, the master network node 160 is first to configure the measurement that requires the at least one measurement gap for the first frequency and the method further includes transmitting the at least one measurement gap for the first frequency to the secondary network node 160b.

In a particular embodiment, the method further includes transmitting the at least one measurement gap for the second frequency to the secondary network node 160b.

In a particular embodiment, the method further includes, upon configuring or releasing a serving cell on the first frequency, transmitting an indication of configuring or releasing the serving cell on the first frequency to the secondary network node 160b.

In a particular embodiment, the method further includes receiving a communication from the secondary node 160b. The communication indicates a configuration or release of a serving cell on the first frequency by the secondary network node 160b.

In a particular embodiment, the method further includes receiving a communication from the secondary node 160b, the communication indicating a configuration of a measurement on the first frequency by the secondary network node 160b.

In a particular embodiment, communication between the master node 160 and the secondary node 160b is via an Xn interface.

In a particular embodiment, configuring the wireless device 110 with the at least one measurement gap for the second frequency includes transmitting an indication of the at least one measurement gap for the second frequency to the wireless device 110.

Figure 17:
FIG. 17 illustrates an exemplary virtual computing device for measurement gap configuration in NE-DC, according to certain embodiments.

FIG. 17 illustrates a schematic block diagram of a virtual apparatus 1100 in a wireless network (for example, the wireless network shown in FIG. 5). The apparatus may be implemented in a wireless device or network node (e.g., wireless device 110 or network node 160 shown in FIG. 5). Apparatus 1100 is operable to carry out the example method described with reference to FIG. 16 and possibly any other processes or methods disclosed herein. It is also to be understood that the method of FIG. 16 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause establishing module 1110, configuring module 1120, and any other suitable units of apparatus 1100 to perform corresponding functions according one or more embodiments of the present disclosure.

According to certain embodiments, establishing module 1110 may perform certain of the establishing functions of the apparatus 1100. For example, establishing module 1110 may establish a connection with a wireless device 110 operating in dual connectivity with the master network node 160 and a secondary network node 160b. According to certain embodiments, the master network node 160 operates on a NR wireless network and the secondary network node 160*b* operates on a LTE network. The measurement gap configuration is configured on a per frequency basis for at least a first frequency and a second frequency on the NR wireless network. Additionally, the measurement gap configuration is configured on a per frequency basis for the first frequency on the LTE network.

According to certain embodiments, configuring module 1120 may perform certain of the configuring functions of the apparatus 1100. For example, configuring module 1120 may configure the wireless device 110 with at least one measurement gap for the second frequency when the master network node configures a measurement that requires the at least one measurement gap.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 18:
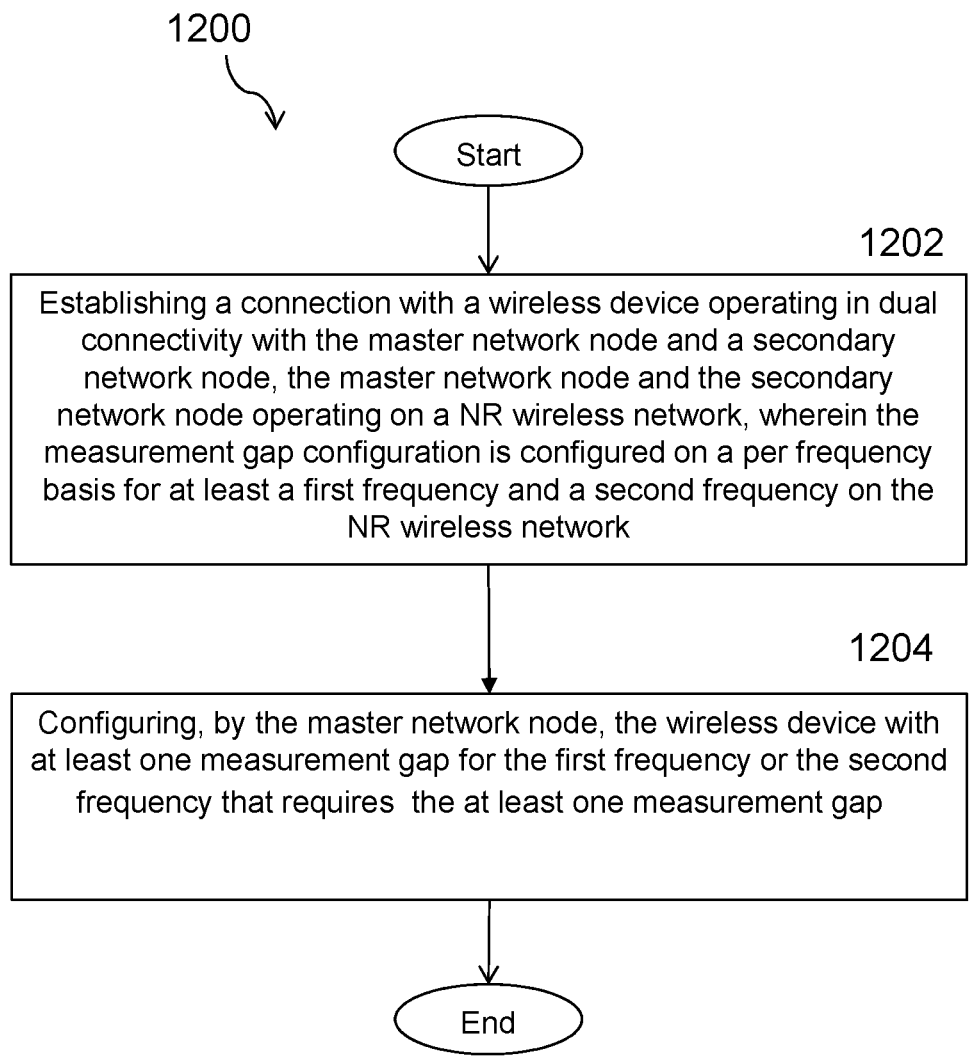
FIG. 18 illustrates an example method by a master network node for measurement gap configuration in NR-NR DC, according to certain embodiments.

FIG. 18 depicts an example method 1200 by a master network node 160 for measurement gap configuration in NR-NR DC, according to certain embodiments. At step 1202, the master network node 160 establishes a connection with a wireless device 110 operating in dual connectivity with the master network node 160 and a secondary network node 160*b*. The master network node 160 and the secondary network node 160*b* operate on a NR wireless network. The measurement gap configuration is configured on a per frequency basis for at least a first frequency and a second frequency on the NR wireless network. At step 1204, the master network node 160 configures the wireless device 110 with at least one measurement gap for the first frequency or the second frequency that requires the at least one measurement gap.

In a particular embodiment, the method further includes transmitting, to the wireless device 110, a modification of the at least one measurement gap for the first frequency or the second frequency.

In a particular embodiment, configuring the wireless device 110 comprises communicating the at least one measurement gap to the wireless device 110 in a RRC reconfiguration message directly from the master network node 160. Alternatively, the at least one measurement gap configuration may be received from the secondary node 160*b* and/or the RRC configuration message is generated by and received from the secondary node 160*b*.

In a particular embodiment, the method may further include transmitting, to the secondary node 160*b*, the at least one measurement gap.

In a particular embodiment, upon configuring or releasing a serving cell on the first frequency or the second frequency, the method may further include communicating an indication that the serving cell has been configured or released to the secondary node 160*b*.

In a particular embodiment, upon configuring a measurement on the first frequency or the second frequency, the method may further include communicating the measurement to the secondary node 160*b*.

In a particular embodiment, the method may further include receiving, from the secondary node 160*b*, an indication that the secondary node has configured or released a serving cell on the first frequency or the second frequency.

In a particular embodiment, the method may further include receiving, from the secondary node 160*b*, an indication that the secondary node has configured a measurement on the first frequency or the second frequency.

In a particular embodiment, communication between the master node 160 and the secondary node 160*b* is via an Xn interface.

Figure 19:
FIG. 19 illustrates an exemplary virtual computing device for measurement gap configuration in NR-NR DC, according to certain embodiments.

FIG. 19 illustrates a schematic block diagram of a virtual apparatus 1300 in a wireless network (for example, the wireless network shown in FIG. 5). The apparatus may be implemented in a wireless device or network node (e.g., wireless device 110 or network node 160 shown in FIG. 5). Apparatus 1300 is operable to carry out the example method described with reference to FIG. 18 and possibly any other processes or methods disclosed herein. It is also to be understood that the method of FIG. 18 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause establishing module 1310, configuring module 1320, and any other suitable units of apparatus 1300 to perform corresponding functions according one or more embodiments of the present disclosure.

According to certain embodiments, establishing module 1310 may perform certain of the establishing functions of the apparatus 1300. For example, establishing module 1310 may establish a connection with a wireless device 110 operating in dual connectivity with the master network node 160 and a secondary network node 160*b*. According to certain embodiments, the master network node 160 and the secondary network node 160*b* operate on a NR wireless network. The measurement gap configuration is configured on a per frequency basis for at least a first frequency and a second frequency on the NR wireless network.

According to certain embodiments, configuring module 1320 may perform certain of the configuring functions of the apparatus 1300. For example, configuring module 1320 may configure the wireless device 110 with at least one measurement gap for the first frequency or the second frequency that requires the at least one measurement gap.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 20:
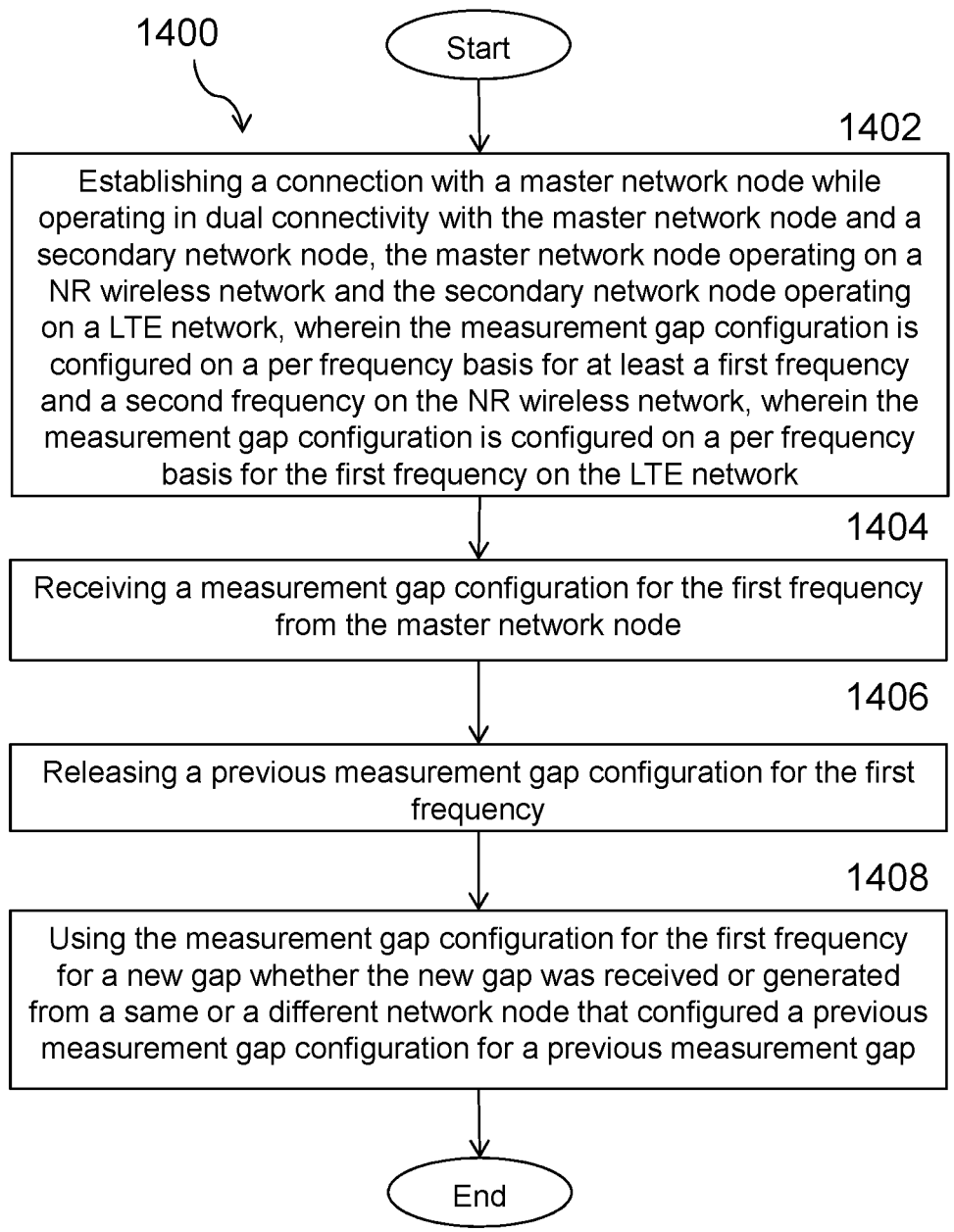
FIG. 20 illustrates an example method by a wireless device for measurement gap configuration in NE-DC or NR-NR DC, according to certain embodiments.

FIG. 20 depicts an example method 1400 by a wireless device 110 for measurement gap configuration in NE-DC or NR-NR DC, according to certain embodiments. At step 1402, the wireless device 110 establishes a connection with a master network node 160 while operating in dual connectivity with the master network node 160 and a secondary network node 160*b*. The master network node 160 operates on a NR wireless network and the secondary network node 160*b* operates on a LTE network. The measurement gap configuration is configured on a per frequency basis for at least a first frequency and a second frequency on the NR wireless network, and the measurement gap configuration is configured on a per frequency basis for the first frequency on the LTE network.

At step 1404, wireless device 110 receives a measurement gap configuration for the first frequency from the master network node 160.

At step 1406, wireless device 110 releases a previous measurement gap configuration for the first frequency.

At step 1408, wireless device 110 uses the measurement gap configuration for the first frequency for a new gap whether the new gap was received or generated from a same or a different network node that configured a previous measurement gap configuration for a previous measurement gap.

Figure 21:
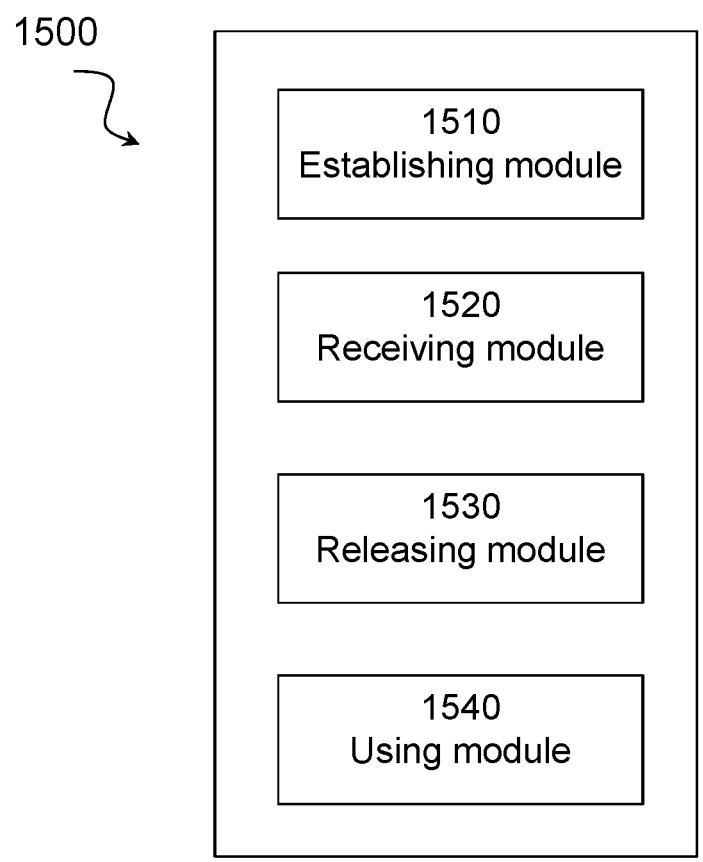
FIG. 21 illustrates an exemplary virtual computing device for measurement gap configuration in NE-DC or NR-NR DC, according to certain embodiments.

FIG. 21 illustrates a schematic block diagram of a virtual apparatus 1500 in a wireless network (for example, the wireless network shown in FIG. 5). The apparatus may be implemented in a wireless device or network node (e.g., wireless device 110 or network node 160 shown in FIG. 5). Apparatus 1500 is operable to carry out the example method described with reference to FIG. 20 and possibly any other processes or methods disclosed herein. It is also to be understood that the method of FIG. 20 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause establishing module 1510, receiving module 1520, releasing module 1530, using module 1540, and any other suitable units of apparatus 1500 to perform corresponding functions according one or more embodiments of the present disclosure.

According to certain embodiments, establishing module 1510 may perform certain of the establishing functions of the apparatus 1500. For example, establishing module 1510 may establish a connection with a master network node 160 while operating in dual connectivity with the master network node 160 and a secondary network node 160*b*. The master network node 160 operates on a NR wireless network and the secondary network node 160*b* operates on a LTE network. The measurement gap configuration is configured on a per frequency basis for at least a first frequency and a second frequency on the NR wireless network, and the measurement gap configuration is configured on a per frequency basis for the first frequency on the LTE network.

According to certain embodiments, receiving module 1520 may perform certain of the receiving functions of the apparatus 1500. For example, receiving module 1520 may receive a measurement gap configuration for the first frequency from the master network node 160.

According to certain embodiments, releasing module 1530 may perform certain of the releasing functions of the apparatus 1500. For example, releasing module 1530 may release a previous measurement gap configuration for the first frequency.

According to certain embodiments, using module 1530 may perform certain of the using functions of the apparatus 1500. For example, using module 1530 may use the measurement gap configuration for the first frequency for a new gap whether the new gap was received or generated from a same or a different network node that configured a previous measurement gap configuration for a previous measurement gap.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

ADDITIONAL INFORMATION

Introduction: This section discusses how to perform the measurements and gap coordination for NE-DC, NGEN-DC and NN-DC.

Discussion 1.1 Measurement Coordination in EN-DC, MR-DC, and NN-DC

In EN-DC, if SRB3 is configured, the SN can directly configure the UE with the SCG configuration (which could include measurement configurations). If SRB3 is not available/configured, the SN sends the SCG configuration to the MN, the MN embeds it in an MN RRC message, and forwards it to the UE.

The main reason to have distributed measurement configurations were different mobility management of LTE and NR and also, to some extent, latency aspects. Thus, supporting both SRB3 for the SN node (NR) and allowing the SN to configure the measurement separately (without involving the MN) can speed up the measurement configuration and reporting related to the SCG. SRB3, since it uses NR radio, may allow faster transmission than the corresponding LTE SRB. Also, the backhaul link between MN and SN may be congested, which could negatively affect both the measurement reporting and new measurement configurations.

Observation 1: A decentralized measurement configuration (i.e. each node configures the measurements separately) can be beneficial for the case where the MN and SN nodes operate on different RATs with different measurement capabilities and for deployments when there could be a large congestion/delay over Xn.

The argument for having lower latency is still relevant in the case of NGEN-DC, but not that important when we have NE-DC (as the MN radio is the one with the highest capacity/lower latency). However, the other arguments are still valid, i.e. NR and LTE have different mobility management and use different RRC protocols. Therefore, we propose the following:

Proposal 1 The MR-DC measurement framework should be based on the EN-DC solution, where both MN and SN can construct the measurement configuration and receive the measurement reports separately.

For the case of NN-DC, the arguments of having separate measurements (and reports) for both the MN and SN for latency and mobility management purposes still apply (i.e., due to the fact that in this case we use only NR nodes). Thus, a reasonable solution would be to still apply the EN-DC solution for NN-DC and have a sort of harmonization regarding the measurements configuration (and reporting) for all the DC options. Therefore, we propose:

Proposal 2 The NN-DC measurement should be based on the EN-DC solution, where both MN and SN can construct the measurement configuration and receive the measurement reports separately.

2.2 Measurement Gap Configuration in EN-DC and MR-DC

In EN-DC, measurement gaps can be configured either per UE (i.e. a single measurement gap used for both FR1 and FR2 frequencies), or separate gaps are configured for FR1 and FR2 frequencies. In the case of per UE gap, the MN configures the measurement gap, while for the case of per FR gaps, the MN configures the FR1 gap while the SN configures the FR2 gaps. The main reason for such a division was that MN can only configure FR1 serving cells (and thus its operation is impacted only by FR1 gaps), while FR2 gap affects the operation of only FR2 serving cells, which only the SN can configure. In the case of per UE gap, SN informs the MN about the measurements that it is configuring and the serving cells it is adding/removing, so that MN can configure the appropriate measurement gap.

In the case of per FR gap, SN informs the MN about measurement configurations and serving cells related to FR1, and MN informs the SN about measurement configurations on FR2. MN configures the FR1 gap and communicates it to the SN, and SN configures the FR2 gaps and communicates it to the MN.

For the case of NGEN-DC, the same principles are applicable as there is no difference between EN-DC and NGEN-DC from the measurement aspect (i.e. as difference between the two is where the MN, LTE, is connected to EPC or 5GC). Thus, we propose:

Proposal 3 For NGEN-DC, the EN-DC concept for measurement gap configuration and co-ordination is fully reused.

When it comes to NE-DC, for the case of per UE gap, the same principle as in EN-DC can also be applied (i.e. MN configures the per UE gap). However, the situation is a bit different for the case of per FR gaps because the MN is now able to configure both FR1 and FR2 serving cells, while the SN is able to configure only FR1 serving cells. Thus, there are different options for handling the per FR measurement gaps:

A. MN configures both FR1 and FR2 gaps
B. MN configures FR2 gaps and SN configures FR1 gaps
C. MN configures FR2 gaps, and whichever node configures measurements on FR1 that requires gaps configures the measurement gap and communicates it to the other node.

A is the simplest solution, and it will make the operation in both per UE and per FR cases to be similar (i.e. MN always sets the gap or gaps required).

B is the reverse case of EN-DC, due to the fact that FR2 is now MN's concern while FR1 is a concern for both MN and SN.

C is the most flexible approach where FR2 is configured by only the MN, while for the FR1, whichever node needs the gap first configures it and communicates to the other so that the other node can reuse the gaps when needed.

A and C are both viable options. On the other side, B can be ruled out because it doesn't apply when the UE is not in DC mode (as the UE could need both FR1 and FR2 gaps even when it is not in DC), and assumes that SN configures the FR1 gaps. That is, in non-DC case, we have to employ case A anyways, so choosing B means we have to support both options A and B. On the other hand, in non-DC case, C and A will be equivalent, and thus only of them need to be standardized/supported.

Observation 2: For NE-DC, for the sake of per UE gap configuration, the EN-DC concept for measurement gap configuration and co-ordination could be reused.

Observation 3: For NE-DC, for the sake of per FR gap configuration, either the MN can configure both gaps, or the FR2 gaps can be configured by the MN while the node requiring the FR1 gaps first can configure it.

If the MN is the first node that configures measurements needing FR1 gaps, then options A and C are also the same. The only difference between the two options is thus when we have a situation where the SN is the node that configures a measurement that requires FR1 gaps.

Figure 4:
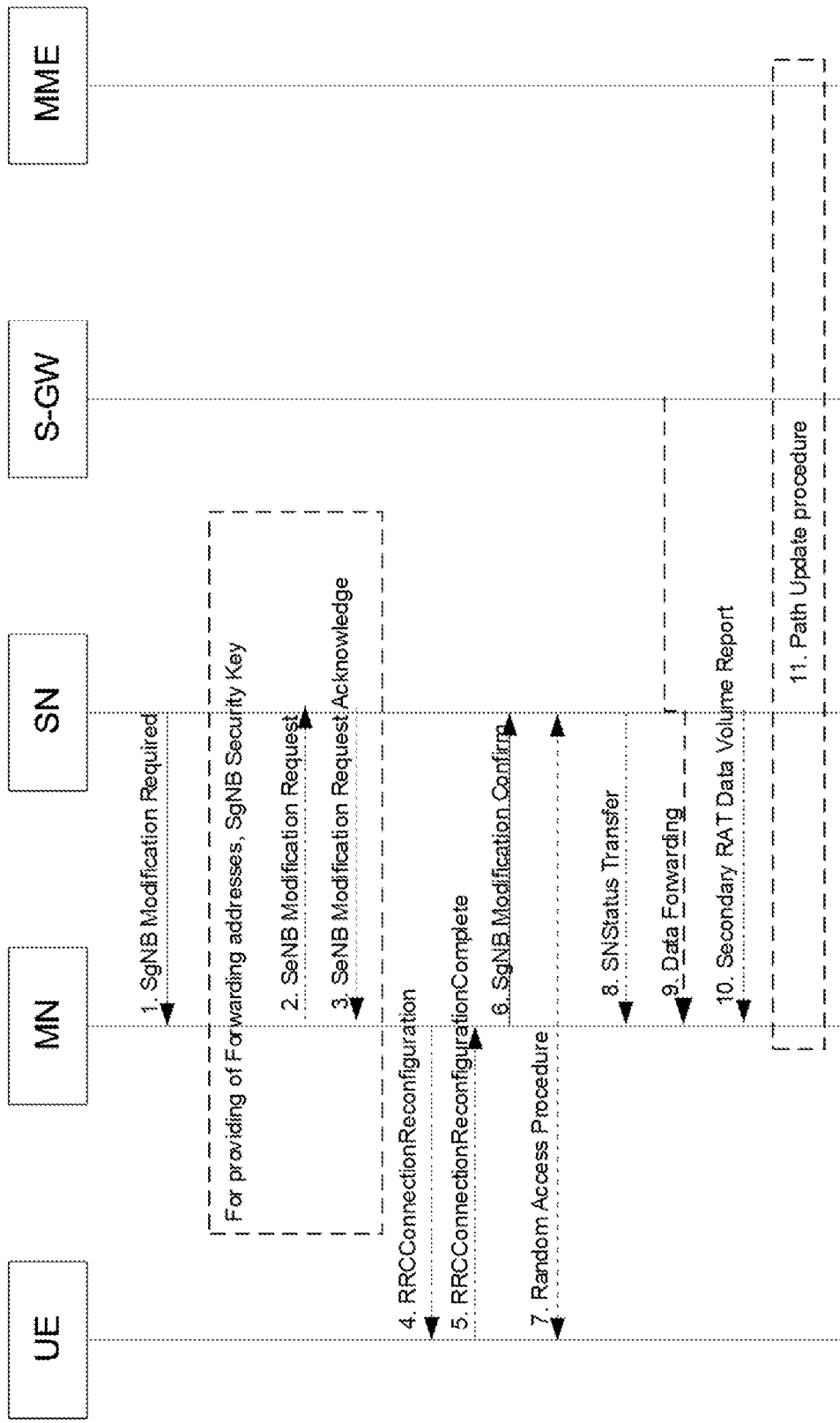
FIG. 4 illustrates the secondary node (SN) triggered SN modification procedure as captured in 3GPP TS 37.340.

FIG. 4 (discussed above) shows the SN triggered SN modification procedure as captured in 37.340, which will be used as a reference for the described aforementioned scenario.

In the following, we will analyse the different network behaviours for the case when Option A and Option C are used.

Option A:

When the SN decides to configure the measurements that require FR1 gaps, it includes the measurement configuration in the CG-Config that is part of the SN/SgNB Modification Required message (which is intended for the UE), and it also indicates to the MN, in the measConfigSN IE, the frequencies that it is configuring the UE with. Then the MN has to prepare the required gap and communicate this to the SN.

Actually, currently there is no possibility to report this to the SN in the SN/SgNB confirmation message, as the CG-ConfigInfo that is used to indicate gaps for the SN is not included in the SgNB confirmation message. This is a RAN3 issue and not discussed in detail here, but it can be resolved by the inclusion of the CG-ConfigInfo in the SN/SgNB Modification confirm message or the usage of the optional messages 2/3 above (i.e. embedded MN initiated SN modification within the SN initiated MN modification) to communicate the gaps to the SN.

Since the SN doesn't know about the exact measurement gap that is going to be configured by the MN until it gets the message 6 (in case SgNB/SN modification confirm is enhanced) or message 2 (in case embedded MN initiated SN modification is used), it may have to refrain from scheduling the UE at all on FR1 frequencies to avoid the possibility of data loss (i.e. SN sending data, but UE not able to receive due to gaps, especially in the case of the gaps being included in message 6, which is sent after the UE has been configured with the gaps from the MN in message 4).

Option C: When the SN decides to configure the measurements that require FR1 gaps, it includes the measurement configuration as well as the gap configuration in the CG-Config that is part of the SgNB/SN Modification Required message (which is intended for the UE). It also indicates the gap configuration for FR1 in the SgNB modification required message, so that the MN will be aware of the gaps in case it will configure serving cells on FR1 later. This way, as the SN knows the gaps to be used from the beginning for FR1, it doesn't have to completely stop scheduling the UE on the FR1 frequencies as in the case of option A.

Considering the above, C seems to be the most robust option that doesn't require unnecessary signalling and prevents possible loss of UE throughput.

Proposal 4 For NE-DC, for the case of per UE gap configuration, the EN-DC concept is reused (i.e. the MN configures the required gap)

Proposal 5 For NE-DC, for the case of per FR gap configurations, the MN configures the FR2 gaps.

Proposal 6 For NE-DC, for the case of per FR gap configurations, the first node (MN or SN) that configures a measurement on FR1 that requires a gap configures the gap and communicates it to the other node.

2.3 Measurement Gap Configuration in NN-DC

In case of NN-DC, for the case of per UE gap, the same principles on EN-DC and MR-DC may be applied and thus is only the MN that configures the per UE gap. However, in case of per FR gaps the situation is different with respect to the other DC options as both MN and SN can configure FR1 and FR2 serving cells.

However, the options described in Section 2.2 and the analysis described conducted for Option A and Option B partially hold. The main difference is that we don't have any restriction on which network node can configure which gaps. Thus, in case of per FR gaps, the first node requiring gaps on FR1 or FR2 will configure the gaps and communicates it to the other node. Thus, it is straightforward to have a similar solution as for NE-DC but applicable on both FR1 and FR2. Thus, we propose:

Proposal 7 For NN-DC, for the case of per UE gap configuration, the EN-DC concept is reused (i.e. the MN configures the required gap)

Proposal 8 For NN-DC, for the case of per FR gap configurations, the first node (MN or SN) that configures a measurement on FR1 or FR2 that requires gaps configures the gap and communicates it to the other node.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Control Plane
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DC Dual Connectivity
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MCG Master Cell Group
MDT Minimization of Drive Tests
MeNB Master eNB
MGL Measurement Gap Length
MGRP Measurement Gap Repetition Period
MIB Master Information Block
MME Mobility Management Entity
MN Master Node
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
PCC Primary Component Carrier
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway PHICH Physical Hybrid-ARQ Indicator Channel
PLMN Public Land Mobile Network
PMI Precoder Matrix Indicator
PRACH Physical Random Access Channel
PRS Positioning Reference Signal
PSC Primary Serving Cell
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCC Secondary Component Carrier
SCG Secondary Cell Group
SCH Synchronization Channel
SCell Secondary Cell
SDU Service Data Unit
SeNB Secondary eNB
SFN System Frame Number
SgNB Term used where SN is gNB
SGW Serving Gateway
SI System Information
SIB System Information Block
SN Secondary Node
SNR Signal to Noise Ratio
SON Self Optimized Network
SRB Signalling Radio Bearers
SS Synchronization Signal
SSC Secondary Serving Cell
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
UP User Plane
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method by a master network node for measurement gap configuration, the method comprising:
establishing a connection with a wireless device operating in dual connectivity with the master network node and a secondary network node, the master network node operating on a New Radio, NR, wireless network and the secondary network node operating on a Long-Term Evolution, LTE, network, wherein the measurement gap configuration is configured on a per frequency basis for at least a first frequency and a second frequency on the NR wireless network, wherein the measurement gap configuration is configured on a per frequency basis for the first frequency on the LTE network;
configuring, by the master network node, the wireless device with at least one measurement gap for the second frequency when the master network node configures a measurement that requires the at least one measurement gap
configuring, by the master network node, the wireless device with at least one measurement gap for the first frequency when the master network node is first to configure a measurement that requires the at least one measurement gap before the secondary network node, and
receiving, from the secondary network node, a configuration of the at least one measurement gap for the first frequency when the secondary network node is first to configure a measurement that requires the at least one measurement gap for the first frequency before the master network node.

2. The method of claim 1, further comprising at least one of:
modifying, by the master network node, the at least one measurement gap for the first frequency, and
receiving, from the secondary network node, a modification of the at least one measurement gap for the first frequency and modifying the at least one measurement gap for the first frequency based on the modification from the secondary network node.

3. The method according to claim 1, wherein the at least one measurement gap for the first frequency is communicated to the wireless device in aRadio Resource Control, RRC, reconfiguration message directly from the node configuring the gap.

4. The method according to claim 1, wherein the at least one measurement gap for the first frequency is received from the secondary node and the method further comprises:
transmitting, in a RRC reconfiguration message from the master network node to the wireless device, the at least one measurement gap for the first frequency received from the secondary node.

5. The method according to claim 4, wherein the RRC reconfiguration message was generated at the secondary node.

6. The method according to claim 4, wherein the RRC reconfiguration message comprises at least one information element generated at the secondary network node, the at least one information element comprising the at least one measurement gap for the first frequency.

7. The method according to claim 1, wherein the master network node is first to configure the measurement that requires the at least one measurement gap for the first frequency and the method further comprises:
transmitting the at least one measurement gap for the first frequency to the secondary network node.

8. The method according to claim 1, further comprising transmitting the at least one measurement gap for the second frequency to the secondary network node.

9. The method according to claim 1, further comprising:
upon configuring or releasing a serving cell on the first frequency, transmitting an indication of configuring or releasing the serving cell on the first frequency to the secondary network node.

10. The method according to claim 1, further comprising receiving a communication from the secondary node, the communication indicating a configuration or release of a serving cell on the first frequency by the secondary network node.

11. The method according to claim 1, further comprising receiving a communication from the secondary node, the communication indicating a configuration of a measurement on the first frequency by the secondary network node.

12. A master network node for measurement gap configuration, the master network node comprising processing circuitry configured to:
   establish a connection with a wireless device operating in dual connectivity with the master network node and a secondary network node, the master network node operating on a New Radio, NR, wireless network and the secondary network node operating on a Long-Term Evolution, LTE, network, wherein the measurement gap configuration is configured on a per frequency basis for at least a first frequency and a second frequency on the NR wireless network, wherein the measurement gap configuration is configured on a per frequency basis for the first frequency on the LTE network;
   configure the wireless device with at least one measurement gap for the second frequency when the master network node configures a measurement a measurement that requires the at least one measurement gap;
   configure the wireless device with at least one measurement gap for the first frequency when the master network node is first to configure a measurement that requires the at least one measurement gap before the secondary network node; and
   receive, from the secondary network node, a configuration of the at least one measurement gap for the first frequency when the secondary network node is first to configure a measurement that requires the at least one measurement gap for the first frequency before the master network node.

13. The master network node of claim 12 wherein the processing circuitry is configured to perform at least one of:
   modifying, by the master network node, the at least one measurement gap for the first frequency, and
   receiving, from the secondary network node, a modification of the at least one measurement gap for the first frequency and modifying the at least one measurement gap for the first frequency based on the modification from the secondary network node.

14. The master network node according to claim 12, wherein the at least one measurement gap for the first frequency is communicated to the wireless device in a Radio Resource Control, RRC, reconfiguration message directly from the node configuring the gap.

15. The master network node according to claim 12, wherein the at least one measurement gap for the first frequency is received from the secondary node and the processing circuitry is configured to:
   transmit, in a RRC reconfiguration message from the master network node to the wireless device, the at least one measurement gap for the first frequency received from the secondary node.

16. The master network node according to claim 15, wherein the RRC reconfiguration message was generated at the secondary node.

17. The master network node according to claim 15, wherein the RRC reconfiguration message comprises at least one information element generated at the secondary network node, the at least one information element comprising the at least one measurement gap for the first frequency.

18. The master network node according to claim 12, wherein the master network node is first to configure the measurement that requires the at least one measurement gap for the first frequency and the processing circuitry is configured to:
   transmit the at least one measurement gap for the first frequency to the secondary network node.

19. The master network node according to claim 12, wherein the processing circuitry is configured to transmit the at least one measurement gap for the second frequency to the secondary network node.

20. The master network node according to claim 12, wherein the processing circuitry is configured to:
   upon configuring or releasing a serving cell on the first frequency, transmit an indication of configuring or releasing the serving cell on the first frequency to the secondary network node.

21. The master network node according to claim 12, wherein the processing circuitry is configured to receive a communication from the secondary node, the communication indicating a configuration or release of a serving cell on the first frequency by the secondary network node.

22. The master network node according to claim 12, wherein the processing circuitry is configured to receive a communication from the secondary node, the communication indicating a configuration of a measurement on the first frequency by the secondary network node.

* * * * *